United States Patent
Namba et al.

[11] Patent Number: 5,574,715
[45] Date of Patent: Nov. 12, 1996

[54] OPTICAL RECORDING MEDIUM

[75] Inventors: Kenryo Namba, Tokyo; Masahiro Shinkai; Tetsushi Inoue, both of Chiba; Sumiko Kitagawa, Saitama, all of Japan

[73] Assignee: TDK Corporation, Tokyo, Japan

[21] Appl. No.: 358,681

[22] Filed: Dec. 19, 1994

Related U.S. Application Data

[63] Continuation of Ser. No. 164,827, Dec. 9, 1993, abandoned, which is a continuation of Ser. No. 53,555, Apr. 20, 1993, abandoned, which is a continuation of Ser. No. 703,668, May 21, 1991, abandoned.

[30] Foreign Application Priority Data

| May 21, 1990 | [JP] | Japan | 2-131009 |
| May 21, 1990 | [JP] | Japan | 2-131010 |
| May 24, 1990 | [JP] | Japan | 2-134386 |

[51] Int. Cl.$^6$ .............................. G11B 7/24; G03C 1/72
[52] U.S. Cl. .............. 369/288; 430/270.19; 430/270.21; 428/64.4
[58] Field of Search ................... 430/495, 270, 430/945, 270.19, 270.21; 428/64, 64.4; 369/288; 360/131, 97.01

[56] References Cited

U.S. PATENT DOCUMENTS

| 4,713,314 | 12/1987 | Namba et al. | 430/270 |
| 4,735,889 | 4/1988 | Namba et al. | 430/495 X |
| 4,737,443 | 4/1988 | Niwa et al. | 430/495 X |
| 4,968,593 | 11/1990 | Inagaski et al. | 430/945 X |
| 4,990,433 | 2/1991 | Yoshida | 430/495 |
| 4,999,281 | 3/1991 | Inagaki et al. | 430/945 X |

FOREIGN PATENT DOCUMENTS

| 0147083 | 7/1985 | European Pat. Off. . |
| 0181941 | 5/1986 | European Pat. Off. . |

*Primary Examiner*—Stuart S. Levy
*Assistant Examiner*—Paul J. Ditmyer
*Attorney, Agent, or Firm*—Watson Cole Stevens Davis, PLLC

[57] ABSTRACT

An optical recording medium having a recording layer and a reflective layer closely stacked on a substrate, wherein recording is carried out by directing recording light to the recording layer to form pits and reproduction is carried out by directing reproducing light to the recording layer. The recording layer contains a light absorbing dye, typically cyanine dye and a bisphenylenedithiol copper complex quencher in either independent form or ionically bonded form. The quencher characterized by a low coefficient of extinction can be added in a sufficient amount to provide the recording layer with light resistance while maintaining recording/reproducing performance.

14 Claims, 4 Drawing Sheets

OPTICAL RECORDING MEDIUM

CROSS-REFERENCE TO THE RELATED APPLICATION

Reference is made to our application U.S. Ser. No. 486,843 filed Mar. 1, 1990 or EPA 90 103691.3 filed Feb. 26, 1990 for "Optical Recording Medium."

This application is a File Wrapper Continuation Application under 37 CFR 1.62 of prior application Ser. No. 08/164,827, filed on 9 Dec. 1993, now abandoned, which is a continuation of application Ser. No. 08/053,555 filed Apr. 20, 1993 and now abandoned, which is a continuation of application Ser. No. 07/703,668, filed 21 May 1991, now abandoned.

FIELD OF THE INVENTION

This invention relates to an optical recording medium, and more particularly, to an optical recording medium of the write-once type intended for compact disks.

BACKGROUND OF THE INVENTION

An additionally or fully recordable optical recording disk was proposed in accordance with the compact disk (generally known as CD) standard. See Nikkei Electronics, Jan. 23, 1989, No. 465, page 107; the Functional Dye Department of the Kinki Chemical Society, Mar. 3, 1989, Osaka Science & Technology Center; and SPIE, Vol. 1078, Optical Data Storage Topical Meeting, 80, 1989.

This disk has a dye layer, a reflective Au layer, and a protective layer disposed on a transparent resin substrate in this order. That is, the reflective layer is in close contact with the dye layer. As opposed to the prior art disk of the air sandwich structure wherein an air layer is provided on a dye layer of the disk in order to allow pits to be formed in the dye layer, the newly proposed disk is of the close contact type wherein the reflective layer is close to the dye layer. The close contact type configuration could meet the total disk thickness of 1.2 mm required by the CD standard.

In the medium of the close contact type wherein a reflective layer is close to a recording layer containing a dye, the recording layer should have a coefficient of extinction k of at most 0.25 and an index of refraction n of 1.8 to 4.0 at the wavelength of the recording and reproducing light and unrecorded portions of the recording layer have a reflectivity of at least 60%, especially at least 70%.

As is well known in the art, a dye layer used as a recording layer experiences a lowering in reproduction capability since a light absorbing dye is less resistant against light and likely to deteriorate in the photon mode upon repetitive reproduction.

To improve the light resistance of a light absorbing dye for avoiding such an output lowering, the inventors proposed to add a singlet oxygen quencher to the dye (Japanese Patent Application Kokai Nos. 166832/1982 and 168048/1982). In the medium of the close contact type, the addition of quenchers which generally have a high coefficient of extinction k causes recording layers to be increased in k and reduced in reflectivity, resulting in a lowering of reproducing properties. The amount of quencher added should be limited in this respect, but at the sacrifice of light resistance which is necessary for satisfactory reproduction.

Further the inventors proposed to use an ionic combination of a dye cation and a transition metal complex anion as a singlet oxygen quencher for the purposes of preventing output lowering and improving light resistance (Japanese Patent Application Kokai No. 159087/1985, 162691/1985, 203488/1985, and 163243/1985). In this combination, the dye cation and the quencher anion are present in 1:1. On the other hand, if a recording layer is formed from a mixture of a cation type dye and a quencher, then there are present four types of ion, a dye cation, a quencher anion and their counter ions in a ratio corresponding to the mix ratio of the dye and the quencher. This suggests that the use of an ionic combination, absent the counter ions of the dye and quencher, has the advantages of less output lowering and higher light resistance than the mix system. Moreover, many ionic combinations have a high distinct melting point whereas mix systems have a low melting point and a broad softening point, that is, poor thermal stability. In this respect, the ionic combinations are effective for reducing the reproduction deterioration of the heat mode and improving shelf stability as well as moisture resistance.

Since conventional quencher anions, however, have a high coefficient of extinction k, the use of an ionic combination in a medium of the close contact type yields a recording layer having increased k and decreased reflectivity therewith, failing to provide satisfactory reproduction. In order to control k to a desired value, another light absorbing dye having low k must be additionally mixed, leading to a lowering of light resistance and thermal stability. Therefore, the prior art close contact type media could not take advantage of the ionic combinations having high light resistance.

SUMMARY OF THE INVENTION

Therefore, an object of the present invention is to provide a reliable optical recording disk of the close contact type which has light resistance for satisfactory recording and reproduction. Another object is to provide such an optical recording medium having heat resistance and moisture resistance as well as light resistance. A further object is to provide such an optical recording medium whose recording/reproducing properties experience a minimal variation with a change in the wavelength of recording and reproducing light.

Briefly stated, the present invention is directed to an optical recording medium comprising a recording layer on a substrate and a reflective layer stacked close to the recording layer. The medium is of the type wherein recording is carried out by directing recording light to the recording layer to form pits and reproduction is carried out by directing reproducing light to the recording layer from the substrate side. Most often, the recording and reproducing light has a wavelength of from 600 to 900 nm.

In the first form, the recording layer contains a light absorbing dye and a bisphenylenedithiol copper complex.

In the second form, the recording layer contains an ionic combination of a cation of a cyanine dye with an anion of a bisphenylenedithiol copper complex.

Preferably, an unrecorded portion of the recording layer has a reflectivity of at least 60% and a recorded portion of the recording layer has a reflectivity which is up to 60% of the reflectivity of the unrecorded portion upon irradiation of reproducing light from the substrate side.

Preferably, the recording layer contains one or more light absorbing dyes which are selected from cyanine dyes. More preferably, the dye is a cyanine dye having a first indolenine ring in condensed or uncondensed form and a second indolenine ring in condensed or uncondensed form different from the first indolenine ring. Such a dye is referred to as a heteronuclear dye for simplicity sake.

Since the quencher used herein has a low coefficient of extinction k of nearly 0 to 0.01 at the wavelength of recording and reproducing light, the amount of the quencher added can be increased while ensuring satisfactory reproduction capability and high light resistance.

The quencher anion also has low k so that the quencher anion-cyanine dye cation combination may have sufficient k to help ensure satisfactory recording/reproducing performance as well as the advantages of the combination itself including resistance against light, heat and moisture.

Better results are obtained with the use of a heteronuclear indolenine cyanine dye since its k and reflectivity are less dependent on wavelength.

These and other features and advantages and attainments of the present invention will become apparent to those skilled in the art upon a reading of the following detailed description when taken in conjunction with the drawings wherein there is shown and described an illustrated embodiment of the invention.

DETAILED DESCRIPTION OF THE INVENTION

Figure 1:
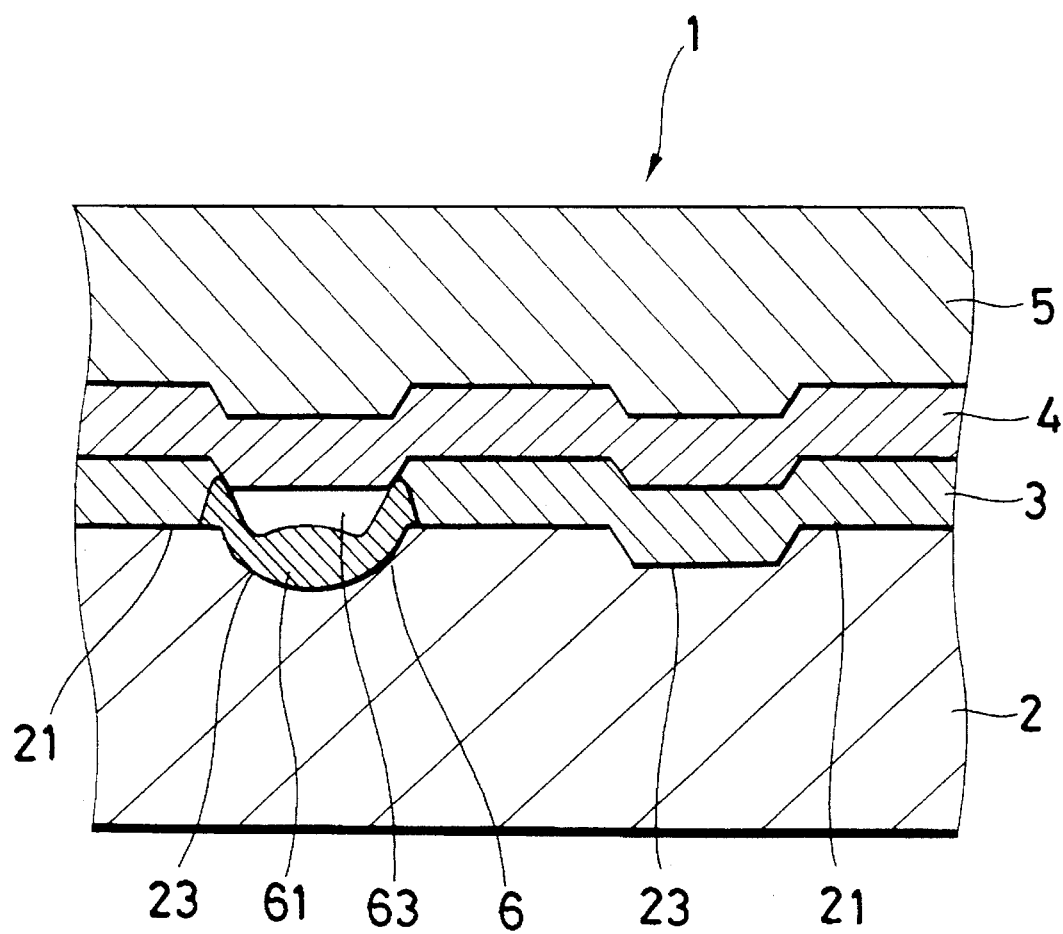
FIG. 1 is a fragmental cross-sectional view of an optical recording medium according to one embodiment of the present invention.

Referring to FIG. 1, there is illustrated in cross section a portion of an optical recording medium 1 according to one embodiment of the invention.

The optical recording medium 1 of the close contact type includes a substrate 2, a dye-containing recording layer 3 on the substrate, and a reflective layer 4 and a protective layer 5 on the recording layer 3 in close arrangement.

Substrate

The substrate 2 is of disk shape having commonly used dimensions, for example, a thickness of about 1.2 mm and a diameter of about 80 or 120 mm according to the CD standard.

The substrate 2 is formed of a material which is substantially transparent to recording and reproducing light, typically a semiconductor laser beam having a wavelength of 600 to 900 nm, especially 700 to 800 nm, most often 780 nm. The substrate material preferably has a transmittance of at least 80%. Then recording and reproducing operation can be made from the rear side of the substrate 2 remote from the recording layer 3. Typical materials are resins and glass. Preferably, thermoplastic resins such as polycarbonate, acryl, amorphous polyolefin, and TPX resins are used.

If desired, the substrate 2 may be provided with an oxygen shielding coating on at least one of its upper and lower surfaces and optionally, on the inner and outer periphery surfaces.

On the surface of the substrate 2 where the recording layer 3 is formed, the upper surface in the illustrated embodiment, a groove 23 is preferably formed for tracking purposes. The tracking groove 23 preferably consists of continuous spiral turns. Typically, the groove 23 has a depth of 250 to 2,000Å, especially 250 to 1,800Å and a transverse distance of 0.3 to 1.1 µm, especially 0.4 to 0.6 µm. The adjoining turns 23 are separated by a land 21 having a transverse distance of 0.5 to 1.3 µm, especially 1.0 to 1.2 µm. The transverse distance of the land is 0.8 to 1.3 times, preferably 1.0 to 1.3 times, more preferably about 1.2 times that of the groove. With this groove configuration, tracking signals can be obtained without reducing the reflection level of the groove.

Where the groove is formed in the surface of the substrate, a provision is preferably made such that recording light is directed to a recording layer within the groove. That is, the optical recording medium of the invention is preferably of the groove recording mode. The groove recording mode allows the recording layer to have an increased effective thickness.

The tracking groove 23 may be provided with recesses or projections (not shown) for address signals. Although not shown in the figure, it is possible to form a resinous layer on the substrate, for example, by a 2P (photopolymerization) method and to form a tracking groove and addressing recesses or projections in the resinous layer. The resin material of which the resinous layer is formed is not particularly limited and may be properly selected from well-known resins commonly used in the 2P method. Most often, a radiation curable compound is selected.

Recording layer

The recording layer 3 is formed on the grooved substrate 2 from a compatible mixture of at least one light absorbing dye and a quencher.

The recording layer preferably has a coefficient of extinction (the imaginary part of a complex index of refraction) k of from 0.01 to 0.25 at the wavelength of recording and reproducing light. With a coefficient of extinction k of less than 0.01, the recording layer can have a lower absorptivity so that it might become difficult to record with a commonly used power. A coefficient of extinction k of more than 0.25 can result in a drop of reflectivity to below 60%, often failing to reproduce according to the CD standard. Better results are obtained when k is in the range of from 0.02 to 0.15, especially from 0.03 to 0.15 although the exact range of k varies with the thickness of the recording layer.

The recording layer preferably has an index of refraction (the real part of a complex index of refraction) n of from 1.8 to 4.0, more preferably 2.2 to 3.3 at the wavelength of recording and reproducing light. With an index of refraction n of lower than 1.8, the reflectivity would be reduced to below 60%, often failing to reproduce according to the CD standard. Few dyes are available which have an index of refraction n of higher than 4.0.

In the first form of the present invention, the recording layer contains a light absorbing dye and a singlet oxygen quencher which is a bisphenylenedithiol copper complex.

The singlet oxygen quencher used herein is at least one copper complex of a bisphenylenedithiol, preferably of the following general formula.

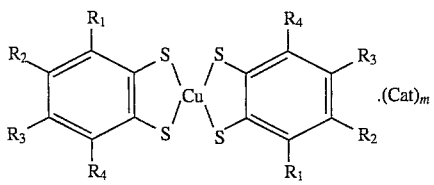

(I)

In formula (I), $R_1$ to $R_4$ are independently selected from the group consisting of a hydrogen atom, an alkyl group preferably having 1 to 8 carbon atoms, a halogen atom, an amino group, and an amino group substituted with an alkyl having 1 to 5 carbon atoms, Cat is a cation such as a quaternary ammonium ion, and letter m is equal to 1 in most cases.

Examples of the quencher of formula (I) are given in the following list. Only substituents on bis-1,2-phenylenedithiol other than H are shown in the list. For example, for Q1, the remaining three substituents are hydrogen.

| Designation | $R_1$–$R_4$ | Cat | m |
|---|---|---|---|
| Q1 | 4-(t-$C_4H_9$) | $N^+$(n-$C_4H_9$)$_4$ | 1 |
| Q2 | 4-(n-$C_8H_{17}$) | $N^+$(n-$C_4H_9$)$_4$ | 1 |
| Q3 | — | $N^+$(n-$C_4H_9$)$_4$ | 1 |
| Q4 | 4-$CH_3$ | $N^+$(n-$C_4H_9$)$_4$ | 1 |
| Q5 | 3,4,6-trichloro | $N^+$(n-$C_4H_9$)$_4$ | 1 |
| Q6 | 4-N($CH_3$) | $N^+$(n-$C_4H_9$)$_4$ | 1 |
| Q7 | 4-N(t-$C_4H_9$) | $N^+$(n-$C_6H_{13}$)$_4$ | 1 |
| Q8 | 3,4-dichloro | $N^+$(n-$C_4H_9$)$_4$ | 1 |

A monolayer film of such a quencher has a coefficient of extinction k of nearly 0 to 0.01 and an index of refraction n of at least 1.5 at the wavelength of recording and reproducing light. These quenchers can be synthesized by conventional methods.

The light absorbing dye used in the first form is not particularly limited insofar as it exhibits a maximum absorption in the wavelength range of from 600 to 900 nm, preferably from 600 to 800 nm, more preferably from 650 to 750 nm. The light absorbing dye is preferably selected from cyanine dyes, phthalocyanine dyes, naphthalocyanine dyes, anthraquinone dyes, azo dyes, triphenylmethane dyes, pyrylium and thiapyrylium salt dyes, squalilium, croconium, and metal complex dyes alone or in admixture of two or more. Preferred among the cyanine dyes are cyanine dyes having an indolenine ring or benzoindolenine ring.

The light absorbing dye may be mixed with an additional quencher. The additional quenchers are preferably metal complexes, for example, acetylacetonato metal complexes, bisdithiol metal complexes such as bisdithio-α-diketone and bisphenyldithiol metal complexes other than the above-mentioned ones, thiocatechol metal complexes, salicylaldehyde oxime metal complexes, and thiobisphenolate metal complexes. Amine quenchers such as amine compounds having a nitrogenous radical cation and hindered amines are also useful.

Further, an ionic combination of a dye cation and a quencher anion may also be used as the light absorbing dye as will be described in conjunction with the second form. For the ionic combination, the dyes are preferably cyanine dyes having an indolenine ring and the quenchers are preferably metal complex dyes such as bisphenyldithiol metal complexes.

Further information about the dyes, quenchers, and ionic combinations is found in the following publications: Japanese Patent Application Kokai (JP-A) Nos.

| | | |
|---|---|---|
| 24692/1984 | 55794/1984 | 55795/1984 |
| 81194/1984 | 83695/1984 | 18387/1985 |
| 19586/1985 | 19587/1985 | 35054/1985 |
| 36190/1985 | 36191/1985 | 44554/1985 |
| 44555/1985 | 44389/1985 | 44390/1985 |
| 47069/1985 | 20991/1985 | 71294/1985 |
| 54892/1985 | 71295/1985 | 71296/1985 |
| 73891/1985 | 73892/1985 | 73893/1985 |
| 83892/1985 | 85449/1985 | 92893/1985 |
| 159087/1985 | 162691/1985 | 203488/1985 |
| 201988/1985 | 234886/1985 | 234892/1985 |
| 16894/1986 | 11292/1986 | 11294/1986 |
| 16891/1986 | 8384/1986 | 14988/1986 |
| 163243/1986 | 210539/1986 | 30088/1987 |
| 32132/1987 | 31792/1987 | |

Japanese Patent Application No. 54013/1985, and "Chemistry of Functional Dyes," CMC Publishing K.K., 1981, pages 74–76.

The quencher may be added either separately from the light absorbing dye or in the form of a bonded combination with the light absorbing dye.

Preferably, the quencher of formula (I) is added in an amount of up to 1 mol, more preferably 0.05 to 0.5 mol, most preferably 0.1 to 0.5 mol per mol of the total light absorbing dyes because a further improvement in light resistance is expectable.

In the practice of the invention, one having k and n within the above-defined ranges is preferably selected from the light absorbing dye-quencher mixtures and dye-quencher bonded combinations. It is also possible to newly set up a molecular design and synthesize such a dye or analogue according to the design.

The coefficient of extinction k of a dye with respect to recording and reproducing light generally varies over the range of from 0 to 2 depending on its skeleton and substituent. In selecting a dye having a preferable value of k, for example, some limitations are imposed on its skeleton and substituent. Then the coating solvent is limited as the case may be. Sometimes, the dye cannot be applied to certain substrates or the dye cannot be deposited from a gas phase. Further, determining a new molecular design requires an increased amount of labor for design and synthesis.

Through experiments, the inventors have found that a dye layer formed of a mixture of at least two dyes has a coefficient of extinction k which is determined from the coefficients of extinction k of the layers consisting of the respective dyes alone, in substantial proportion to the ratio of the dyes. Thus it is possible to form the recording layer from a compatible mixture of two or more dyes.

Most mixtures of dyes have a coefficient of extinction k substantially proportional to the mixing ratio of dyes. More particularly, a mixture of i types of dye has a coefficient of extinction k substantially equal to $\Sigma C_i k_i$ wherein the i-th dye has a coefficient of extinction $k_i$ and a mixing fraction $C_i$. Thus a dye layer having k=0.03 to 0.25 may be formed by mixing dyes having different k in a controlled mixing ratio. This, in turn, means that the dyes used herein can be selected from a wider variety.

The same principle as above can be applied to an improvement in wavelength dependency. In general, a semiconductor laser produces a beam having a wavelength width of ±10 nm. Commercial CD players require a reflectivity of at least 70% in the wavelength range between 770 nm and 790 nm. Generally, the coefficient of extinction k of a dye is largely dependent on a wavelength. Some dyes can have an adequate coefficient k at 780 nm, but a largely deviated coefficient k at 770 or 790 nm. In this case, a second dye may be mixed with a first dye to form a mixture which has adequate values of k and n over the wavelength range of 780±10 nm.

This eliminates the limitation of film formation such as limitation of a coating solvent and allows for the use of a readily synthesizable, inexpensive dye, a dye having excellent properties, or a sparingly soluble dye.

Where the recording layer is formed of a mixture of dyes, the dyes may be selected from those having an index of refraction n=1.6 to 6.5 and a coefficient of extinction k=0 to 2. Preferred are indolenine cyanine dyes having differently condensed indolenine rings or methine chains of different length.

In determining n and k, a sample is prepared by forming a recording layer on a given transparent substrate to a thickness of about 400 to 800Å. Then the reflectivity of the sample is measured through the substrate or from the recording layer side. Reflectivity is measured in a mirror reflection mode (of the order of 5°) using light having the recording/reproducing wavelength. The transmittance of the sample is also measured. The index of refraction n and coefficient of extinction k may be calculated from these measurements according to K. Ishiguro, "Optics," Kyoritsu Publishing K.K., pages 168–178.

The recording layer 3 preferably has a thickness of 500 to 3,000Å, especially 500 to 2,000Å. Outside the range, reflectivity can be lowered below the permissible level to reproduce according to the CD standard.

It is not critical how to form the recording layer 3. In the practice of the invention, the recording layer is preferably formed by coating because of many advantages including wider selection of the applicable dye, freedom of medium design, and ease of manufacture. To form the recording layer by coating, the solvent may be selected from ketones, esters, ethers, aromatics, alkyl halides, and alcohols. Spin coating is a typical coating technique.

Alternatively, the recording layer 3 may be formed by vacuum deposition or evaporation.

In the second form, the recording layer contains an ionic bonded combination or compound of a light absorbing cyanine dye cation and a singlet oxygen quencher anion which is a bisphenylenedithiol copper complex anion.

The quencher anion is represented by formula (I'):

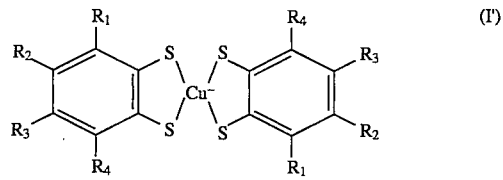

wherein $R_1$ to $R_4$ are are defined above. The quencher anion is generally present as being paired with a counter ion such as quaternary ammonium ion, that is, as a complex of formula (I).

The light absorbing cation type dye used in the second form is not particularly limited insofar as it exhibits a maximum absorption in the wavelength range of from 600 to 900 nm, preferably from 600 to 800 nm, more preferably from 650 to 750 nm. The light absorbing cation type dye is preferably selected from cyanine dyes, pyrylium and thiapyrylium salt dyes, azulenium dyes, and mixtures thereof. Preferred among others are cyanine dyes, desirably having an indolenine or benzoindolenine ring. These dye cations are described in JP-A 159087/1985, 162691/1985, 203488/1985, and 163243/1985.

Preferred examples of the dye are given below.

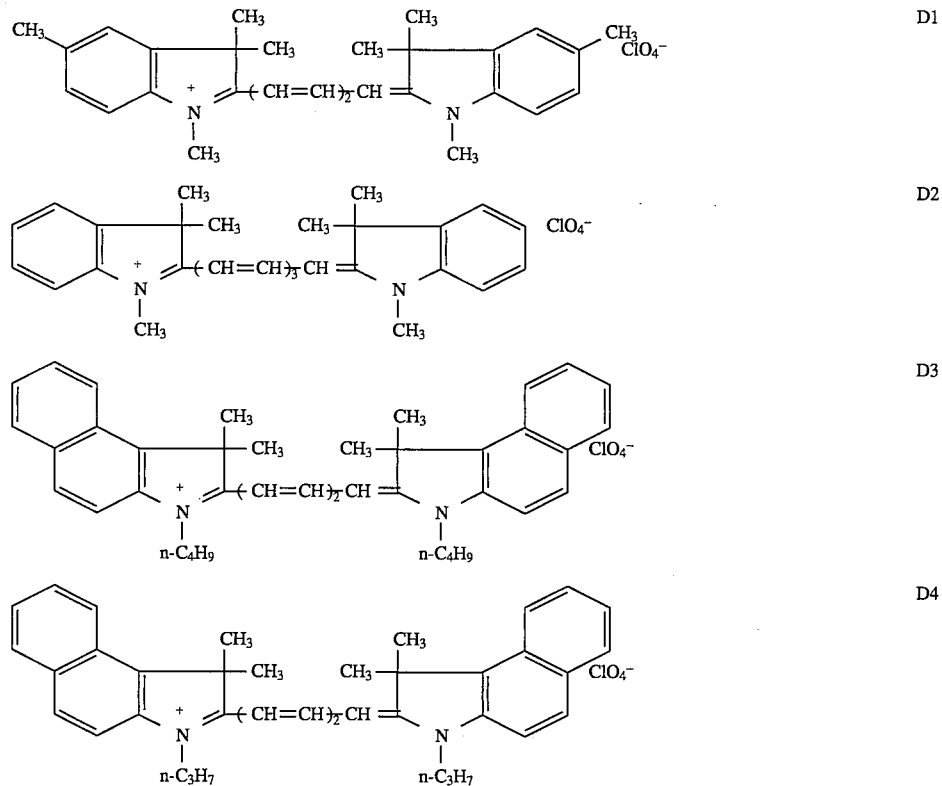

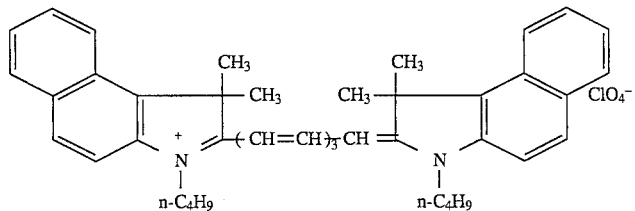
D5
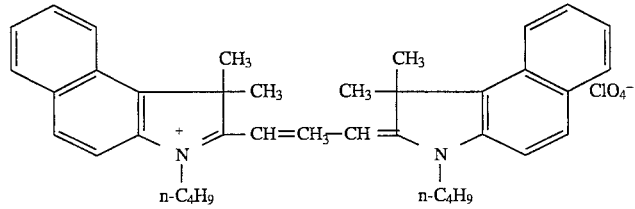
D6
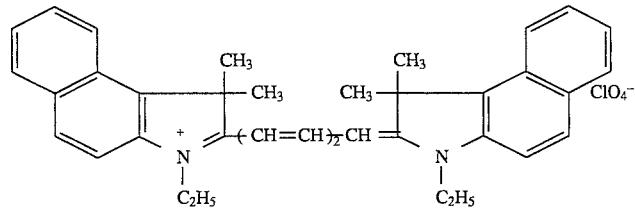
D7
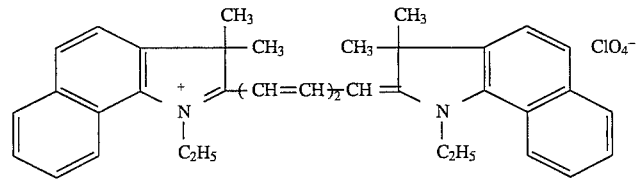
D8
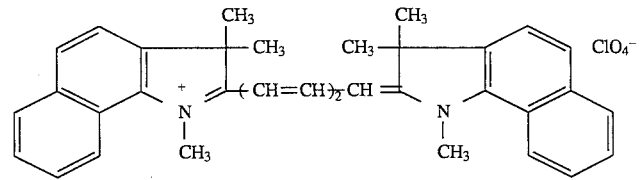
D9
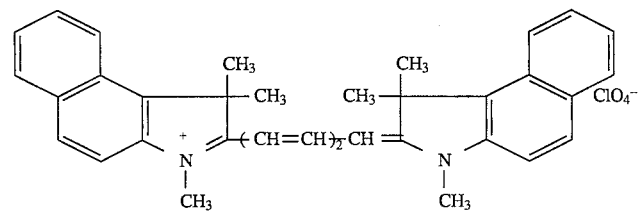
D10
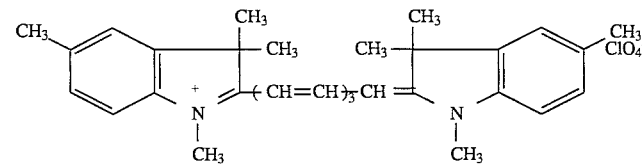
D11
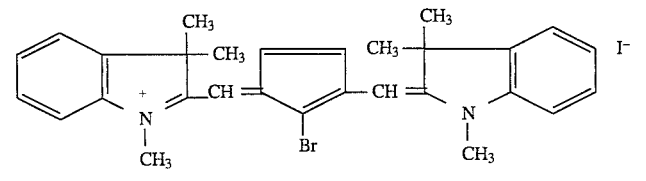
D12

-continued
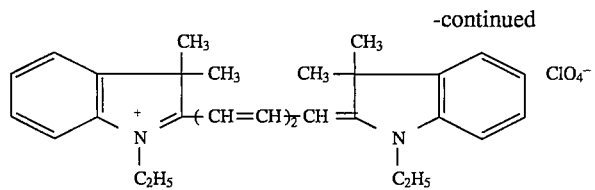
D13
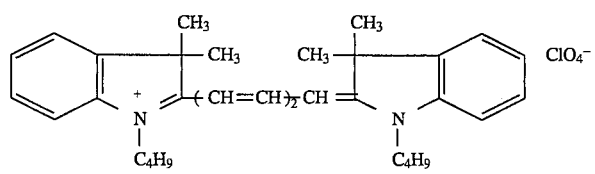
D14
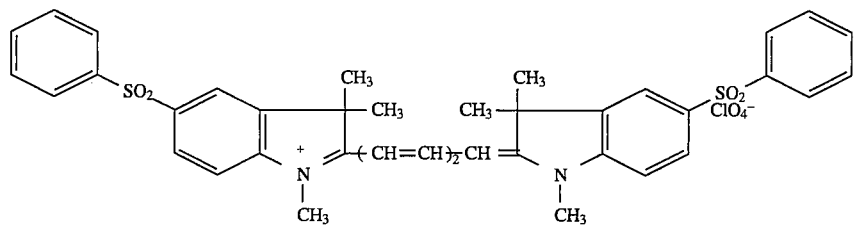
D15
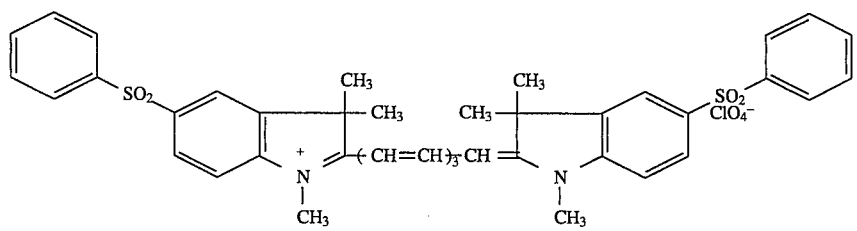
D16
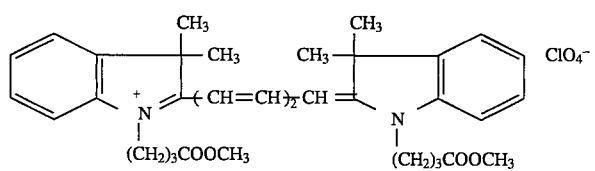
D17
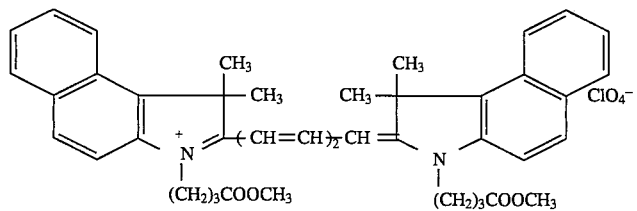
D18
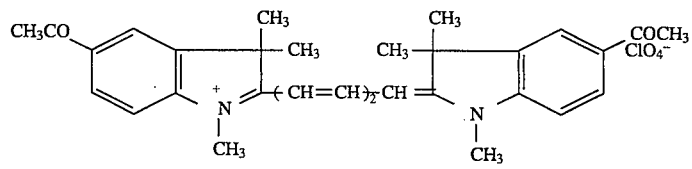
D19
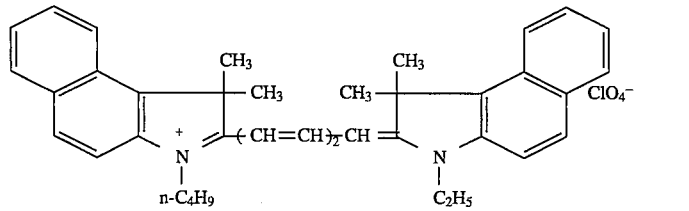
D20

-continued
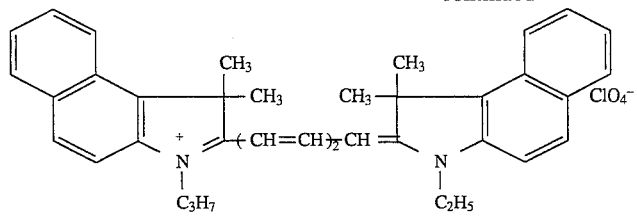 D21
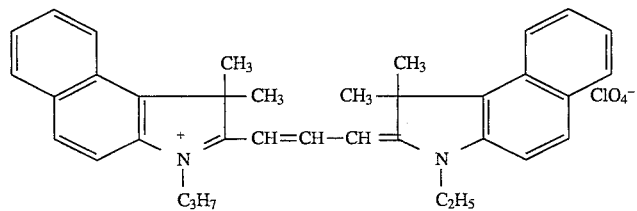 D22
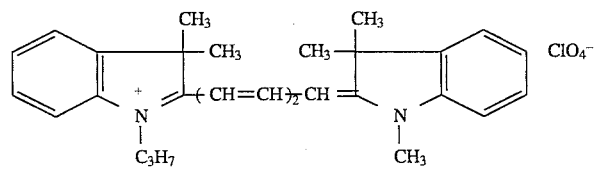 D23
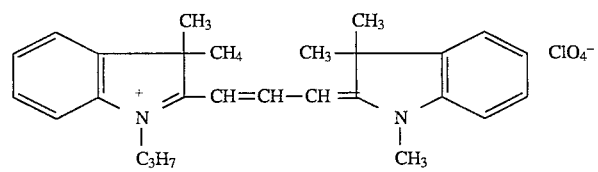 D24
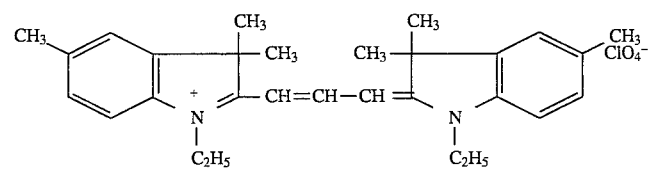 D25
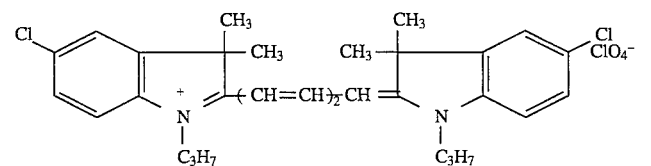 D26
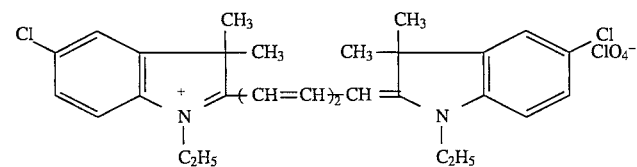 D27
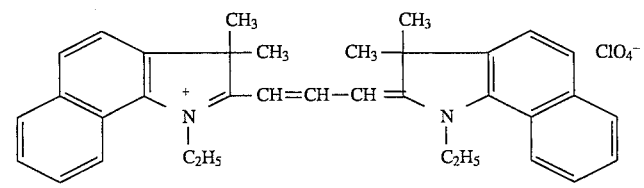 D28
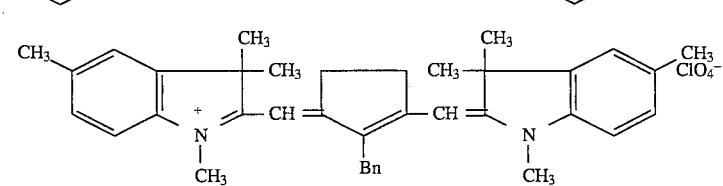

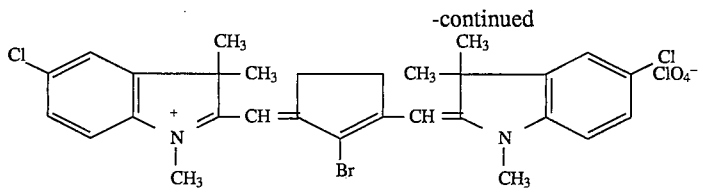

D30

As seen from the foregoing exemplary formulae, the dye cations form cation type dyes with various acid anions.

The cation type dyes and the anion type quenchers may be readily synthesized as ionic combinations of dye cations and quencher anions by the method described in the above-cited Japanese publications.

Examples of the combination are given below. In the following list, $Q^-1$ designates an anion of quencher Q1 and $D^+1$ designates a cation of dye D1, and so forth.

| Combination | Dye cation | Quencher anion |
|---|---|---|
| C1 | $D^+1$ | $Q^-1$ |
| C2 | $D^+2$ | $Q^-1$ |
| C3 | $D^+3$ | $Q^-1$ |
| C4 | $D^+4$ | $Q^-1$ |
| C5 | $D^+7$ | $Q^-1$ |
| C6 | $D^+8$ | $Q^-1$ |
| C7 | $D^+13$ | $Q^-1$ |
| C8 | $D^+14$ | $Q^-1$ |
| C9 | $D^+15$ | $Q^-1$ |
| C10 | $D^+20$ | $Q^-1$ |
| C11 | $D^+26$ | $Q^-1$ |
| C12 | $D^+3$ | $Q^-4$ |
| C13 | $D^+4$ | $Q^-4$ |
| C14 | $D^+8$ | $Q^-4$ |
| C15 | $D^+13$ | $Q^-4$ |
| C16 | $D^+14$ | $Q^-4$ |
| C17 | $D^+19$ | $Q^-4$ |
| C18 | $D^+26$ | $Q^-4$ |
| C19 | $D^+1$ | $Q^-5$ |
| C20 | $D^+2$ | $Q^-5$ |
| C21 | $D^+3$ | $Q^-5$ |
| C22 | $D^+4$ | $Q^-5$ |
| C23 | $D^+7$ | $Q^-5$ |
| C24 | $D^+8$ | $Q^-5$ |
| C25 | $D^+13$ | $Q^-5$ |
| C26 | $D^+15$ | $Q^-5$ |
| C27 | $D^+1$ | $Q^-6$ |
| C28 | $D^+4$ | $Q^-6$ |
| C29 | $D^+8$ | $Q^-6$ |
| C30 | $D^+13$ | $Q^-6$ |
| C31 | $D^+14$ | $Q^-6$ |
| C32 | $D^+15$ | $Q^-6$ |
| C33 | $D^+19$ | $Q^-6$ |
| C34 | $D^+20$ | $Q^-6$ |
| C35 | $D^+26$ | $Q^-6$ |

Since these dye-quencher bonded combinations alone have k and n within the above-defined ranges, the recording layer may be formed therefrom.

The coefficient of extinction k of a dye cation with respect to recording and reproducing light generally varies over the range of from 0 to 2 depending on its skeleton and substituent. In selecting a cation type dye having a preferable value of k, for example, form a combination, some limitations are imposed on its skeleton and substituent. Then the coating solvent is limited as the case may be, and sometimes, the dye cannot be applied to certain substrates. Further, determining a new molecular design requires an increased amount of labor for design and synthesis.

Through experiments, the inventors have found that a dye layer formed of a mixture of at least two dyes has a coefficient of extinction k which is determined from the coefficients of extinction k of the layers consisting of the respective dyes alone, in substantial proportion to the ratio of the dyes. Thus it is possible to form the recording layer from a compatible mixture of combinations of two or more dye cations. The same principle as previously described in conjunction with the dye mixture holds true for the synthesis of k resulting from a mixture of dye-quencher combinations. The same benefits as previously described are available.

Where the recording layer is formed of a mixture of dye-quencher combinations, the combinations may be selected from those having an index of refraction n=1.6 to 6.5 and a coefficient of extinction k=0 to 2. Preferred is a mixture of combinations having indolenine cyanine dye cations having differently condensed indolenine rings or methine chains of different length.

The determination of n and k is the same as above.

The recording layer can be formed of at least one combination as defined above while the layer may further contain another light absorbing dye or quencher or combination. Preferably, the combination(s) as defined herein should occupy 80 to 100% by weight of the recording layer.

The other light absorbing dye which can be used in addition to the cyanine dye-quencher combination defined herein is not particularly limited insofar as it exhibits a maximum absorption in the wavelength range of from 600 to 900 nm, preferably from 600 to 800 nm, more preferably from 650 to 750 nm. The light absorbing dye is preferably selected from cyanine dyes, phthalocyanine dyes, naphthalocyanine dyes, anthraquinone dyes, azo dyes, triphenylmethane dyes, pyrylium and thiapyrylium salt dyes, squalilium, croconium, and metal complex dyes alone or in admixture of two or more. Preferred among the cyanine dyes are cyanine dyes having an indolenine ring, especially a benzoindolenine ring.

The other quencher which can be used in addition to the cyanine dye-quencher combination defined herein is preferably selected from metal complexes, for example, acetylacetonato metal complexes, bisdithiol metal complexes such as bisdithio-α-diketone and bisphenyldithiol metal complexes as defined by formula (I), thiocatechol metal complexes, salicylaldehyde oxime metal complexes, and thiobisphenolate metal complexes. Amine quenchers such as amine compounds having a nitrogenous radical cation and hindered amines are also useful.

Where another combination is used in addition to the cyanine dye-quencher combination defined herein, it is preferably formed from a cyanine dye having an indolenine ring and a metal complex quencher as typified by a bisphenylenedithiol metal complex.

Further information about the dyes, quenchers, and ionic combinations is found in the previous list of references.

The thickness and formation of the recording layer 3 are the same as previously described in conjunction with the first form.

In the preferred form, the dye used in either the first or second form or the additional dye is a cyanine dye having a first indolenine ring in condensed or uncondensed form and a second indolenine ring in condensed or uncondensed form different from the first indolenine ring. Typical is a cyanine dye having a condensed indolenine ring and an uncondensed indolenine ring.

The heteronuclear indolenine cyanine dye is preferably represented by the following formula (II).

$$\Phi^+ - L = \Psi \cdot An^- \qquad (II)$$

In formula (II), $\Phi^+$ is an indolenine ring in condensed or uncondensed form and $\Psi$ is another indolenine ring in condensed or uncondensed form different from the indolenine ring represented by $\Phi^+$. Preferred are indolenine, 4,5-benzoindolenine, 6,7-benzoindolenine, and 4,5,6,7-dibenzoindolenine rings. L is a polymethine linkage for forming a cyanine dye, especially, a trimethine, pentamethine or heptamethine chain.

The rings $\Phi^+$ and $\Psi$ and linkage L may be selected from well-known ones as described in the following publications.

| JP-A Nos. | | |
|---|---|---|
| 24690/1984 | 24692/1984 | 55795/1984 |
| 67092/1984 | 163243/1985 | 203488/1985 |
| 214994/1985 | 230891/1985 | 9991/1988 |
| 179792/1988 | 40381/1989 | 40382/1989 |
| 40383/1989 | 40384/1989 | 40386/1989 |
| 40387/1989 | 40389/1989 | 40390/1989 |
| 49682/1989 | 49683/1989 | 131277/1989 |
| 133791/1989 | 45191/1990 | |

$An^-$ is an anion which may be selected from various acid anions as as described in the foregoing publications. Also useful are anions of singlet oxygen quenchers as described in the following publications.

| JP-A Nos. | | |
|---|---|---|
| 163243/1985 | 203488/1985 | 124986/1987 |
| 174741/1987 | 12592/1988 | 29991/1988 |
| 102047/1988 | 179793/1988 | 231987/1988 |
| 288785/1988 | 288786/1988 | 307854/1988 |

| JP-A Nos. | | |
|---|---|---|
| 31689/1989 | 75568/1989 | 163189/1989 |
| 166987/1989 | 210389/1989 | 29384/1990 |
| 166986/1990 | | |

It will be appreciated that $An^-$ may be omitted when $\Phi^+ - L = \Psi$ has an anionic substituent to form an intramolecular salt.

The dye of formula (II) may form a dimer or polymer.

A cation of the dye of formula (II) ionically bonded with a single oxygen quencher anion is more effective in alleviating output lowering. The single oxygen quencher anion is preferably an anion of a bisphenylenedithiol metal complex, which is represented by the following formula (I"):

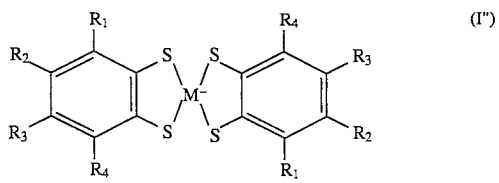

wherein $R_1$ to $R_4$ are as defined above, and M is Cu, Ni, Co, Pd, or Pb. Preferred M is Cu because the wavelength dependency of k and reflectivity is minimized. The quencher anion is generally present as being paired with a counter ion such as quaternary ammonium ion, that is, as a complex of formula (I) when M is Cu. The characteristics of the quencher including k and n are the same as previously described.

Examples of the heteronuclear indolenine cyanine dye of formula (II) are given below.

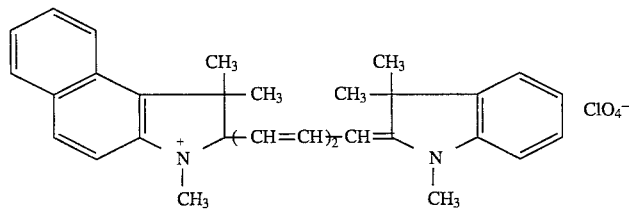

Dh1

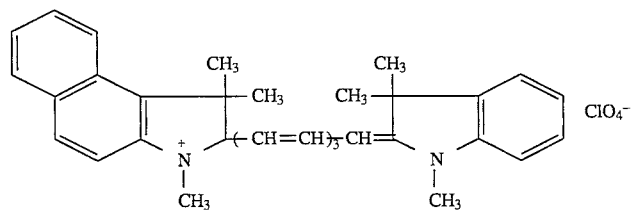

Dh2

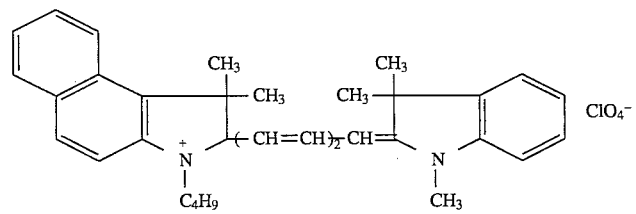

Dh3

-continued
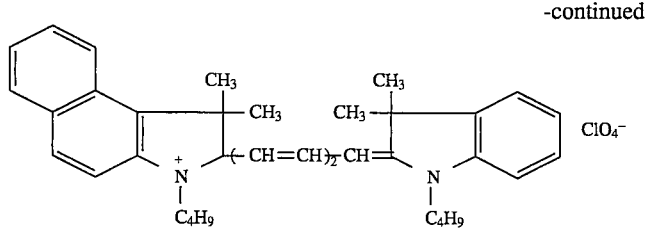 Dh4
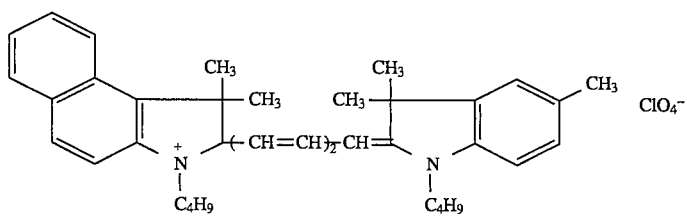 Dh5
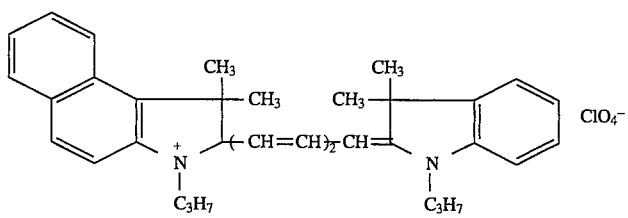 Dh6
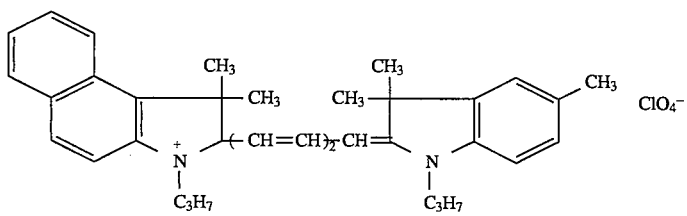 Dh7
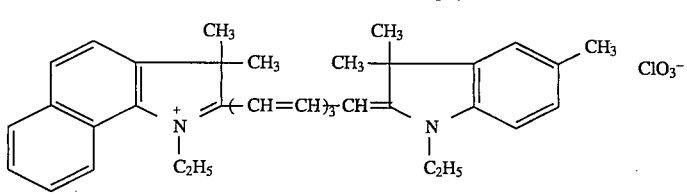 Dh8
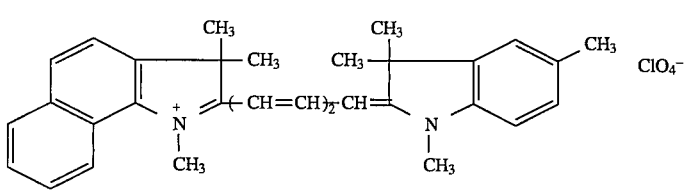 Dh9
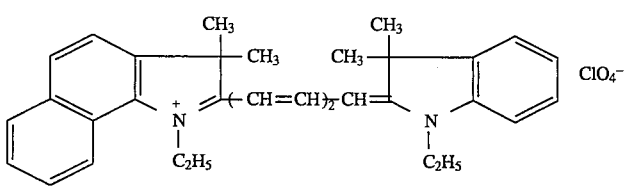 Dh10
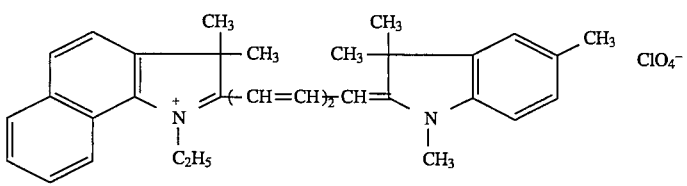 Dh11

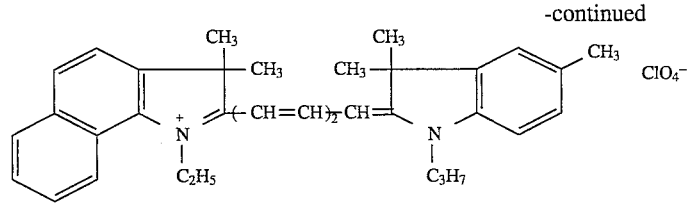 Dh12
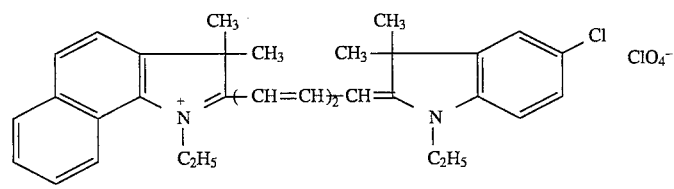 Dh13
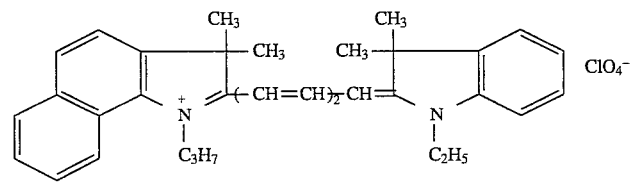 Dh14
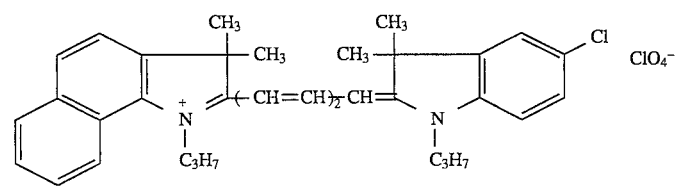 Dh15
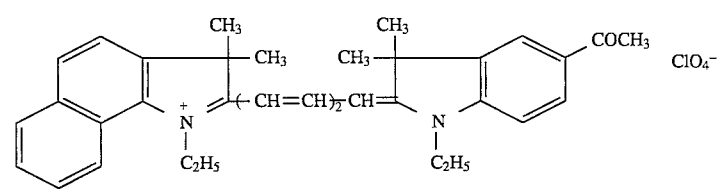 Dh16
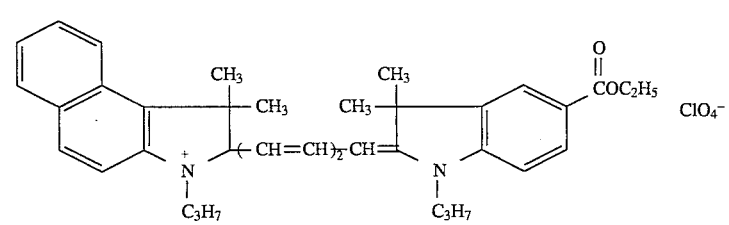 Dh17
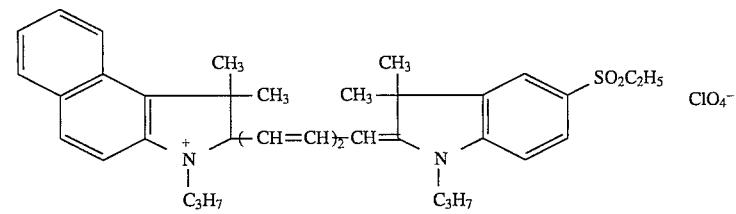 Dh18
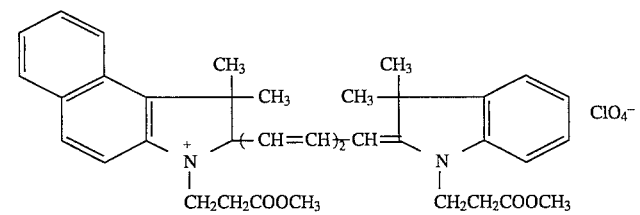 Dh19

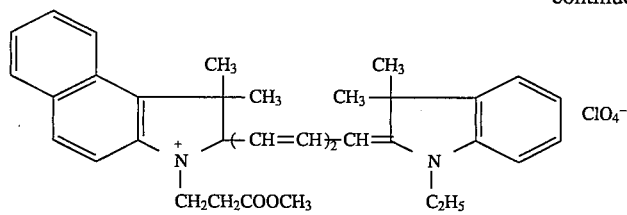
Dh20
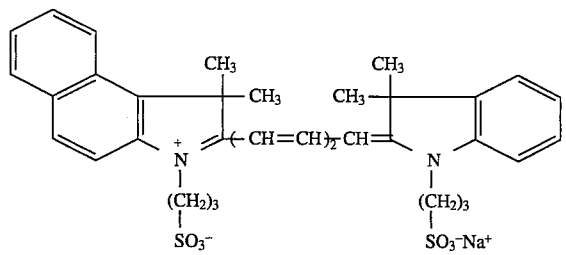
Dh21
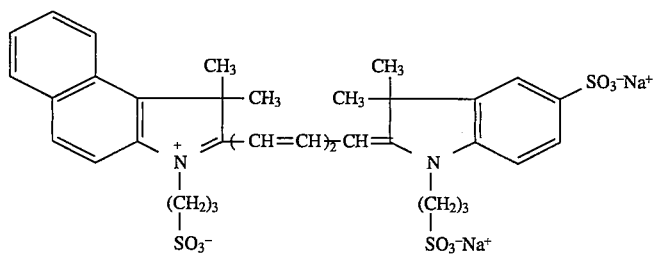
Dh22
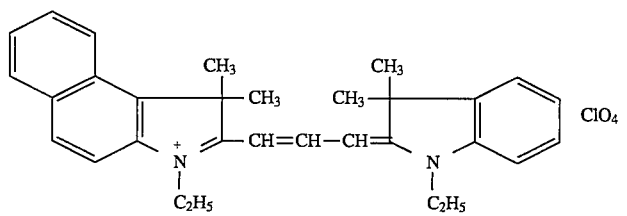
Dh23
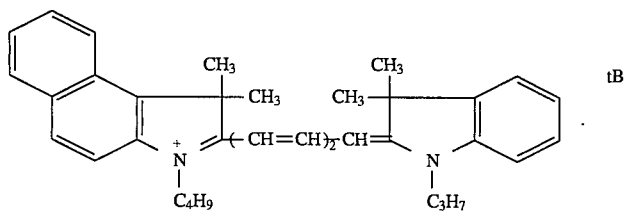
Dh24
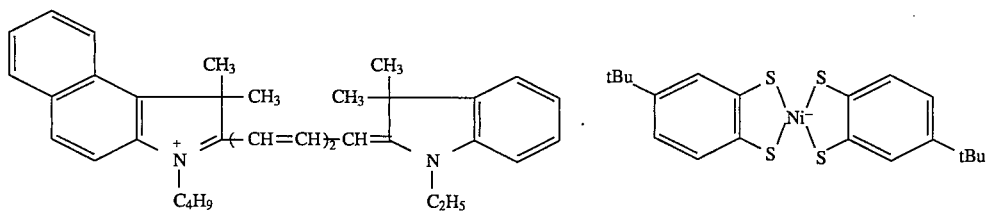
Dh25
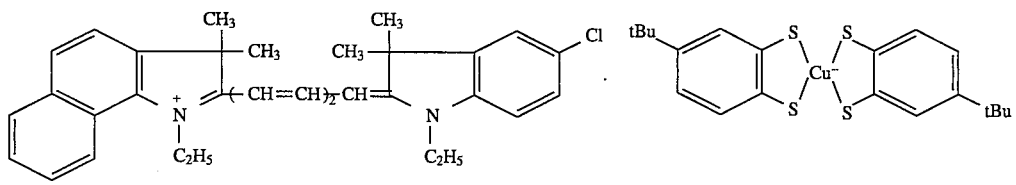
Dh26

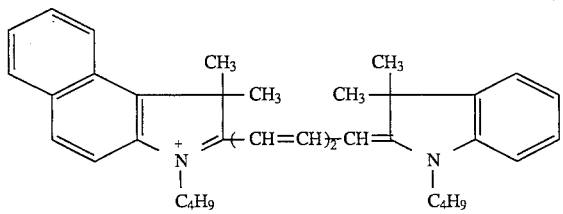
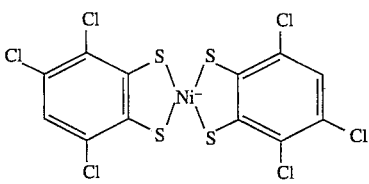

Dh27

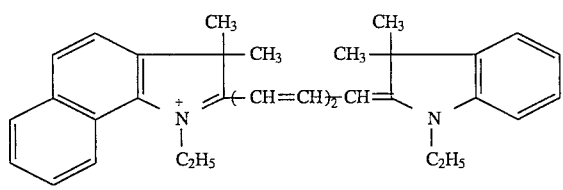
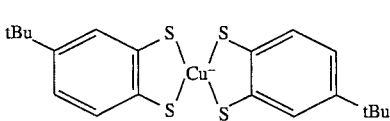

Dh28

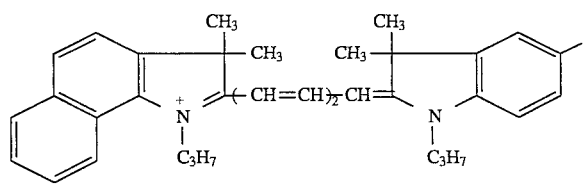
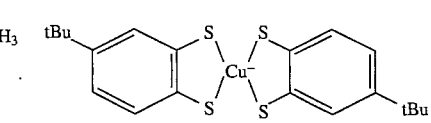

Dh29

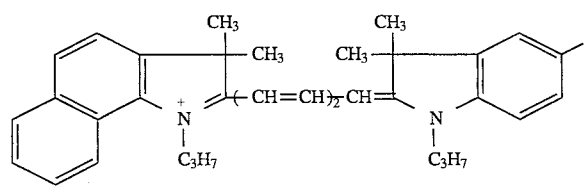

Dh30

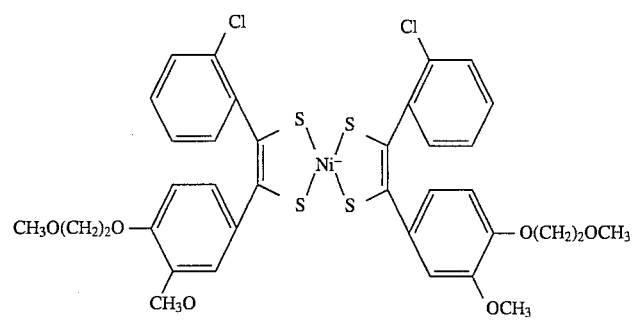

Reflective layer

The reflective layer 4 is applied to the recording layer 3 in direct contact therewith.

The reflective layer may be formed from any desired high reflectivity material, for example, Au, Al—Mg alloys, Al—Ni alloys, Ag, Pt and Cu. Among them, Au, Al—Mg alloys, and Al—Ni alloys are preferred for higher reflectivity. Preferred Al—Mg alloys contain about 3 to 7% by weight of magnesium and preferred Al—Ni alloys contain about 3 to 4% by weight of nickel are preferred.

The reflective layer 4 preferably has a thickness of at least 500Å. It can be formed by evaporation or sputtering. Although no upper limit is generally imposed on the thickness of the reflective layer, a thickness of up to about 1,000Å is preferred for manufacturing cost and time. Within this arrangement, the reflectivity of an unrecorded portion of the medium through the substrate can be at least 60%, especially at least 70%.

Protective layer

The protective layer 5 may be formed on the reflective layer 4.

The protective layer may be formed from any desired resin material such as a UV-curable resin, usually to a thickness of about 0.1 to 100 μm. The protective layer may be either a layer or a sheet.

The protective layer is preferably prepared by coating a composition of a radiation-curable compound and a photopolymerization sensitizer and curing the coating with radiation.

Preferably, the protective layer has a hardness in the range of H to 8H, especially 2H to 7H in pencil hardness at 25° C. according to JIS K-5400. This hardness range leads to a substantial reduction of jitter. In addition, the protective layer will not separate from the underlying reflective layer during shelf storage under high-temperature, high-humidity conditions or varying temperature and humidity conditions. More specifically, jitter can increase if the protective layer is softer than pencil hardness H. A protective layer harder than 8H becomes brittle and difficult to form or does not fully adhere to the underlying reflective layer.

The radiation curable compounds used in forming the protective layer include oligoester acrylates.

The oligoester acrylates are oligoester compounds having at least two acrylate or methacrylate groups. Preferred oligoester acrylates have a molecular weight of 1,000 to 10,000, more preferably 2,000 to 7,000 and a degree of polymerization of 2 to 10, more preferably 3 to 5. Most preferred are polyfunctional oligoester acrylates having 2 to 6, especially 3 to 6 acrylate or methacrylate groups.

These polyfunctional oligoester acrylates are commercially available under the trade names of Aronix M-7100, M-5400, M-5500, M-5700, M-6250, M-6500, M-8030, M-8060, M-8100, etc. from Toa Synthetic K.K. They are represented by the following formulae.

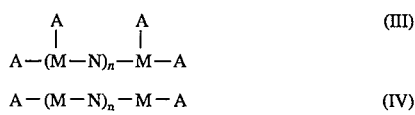

In the formulae, A is an acrylate or methacrylate group, M is a dihydric alcohol residue (for example, ethylene glycol, diethylene glycol, 1,6-hexane glycol, and bisphenol-A), N is a dibasic acid residue (for example, terephthalic acid, isophthalic acid, adipic acid, and succinic acid), and letter n is a number of 1 to 10, especially 2 to 5. The polyfunctional oligoester acrylates of formula (III) are especially preferred.

The oligoester acrylates may be used alone or in combination with another radiation-curable compound. In the latter case, the oligoester acrylate is preferably present in an amount of at least 20% by weight in a mixture thereof with the radiation-curable compound.

The radiation-curable compounds used in combination with the oligoester acrylates include monomers, oligomers, and polymers having incorporated in their molecule a group capable of crosslinking or polymerization upon exposure to radiation, for example, an acrylic double bond as given by acrylic acid, methacrylic acid and their esters which are sensitive to an ionization energy and capable of radical polymerization, an allyl double bond as given by diallyl phthalate, and an unsaturated double bond as given by maleic acid and maleic derivatives. They are preferably polyfunctional, especially at least trifunctional.

The radiation-curable monomers are usually compounds having a molecular weight of lower than 2,000 and the oligomers are those having a molecular weight of 2,000 to 10,000.

Examples include styrene, ethylacrylate, ethylene glycol diacrylate, ethylene glycol dimethacrylate, diethylene glycol diacrylate, diethylene glycol methacrylate, 1,6-hexaneglycol diacrylate, 1,6-hexaneglycol dimethacrylate, and more preferably pentaerythritol tetraacrylate (and methacrylate), pentaerythritol triacrylate (and methacrylate), trimethylolpropane triacrylate (and methacrylate), trimethylolpropane diacrylate (and methacrylate), acryl modified products of urethane elastomers (e.g., Nippolane 4040 available from Nippon Polyurethane K.K.), and derivatives thereof having a functional group such as COOH incorporated therein, acrylates and methacrylates of phenol ethylene oxide adducts, and compounds having a pentaerythritol fused ring represented by the following general formula and having an acryl or methacryl group or ε-caprolactone-acryl group attached thereto:

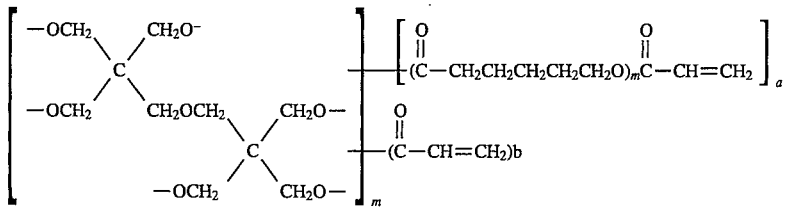
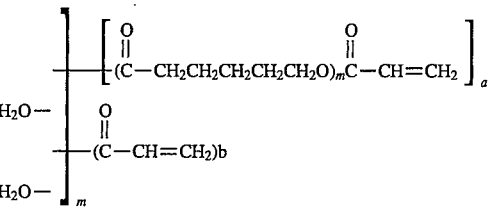

for example, a compound wherein m=1, a=2, and b=4 (to be referred to as special pentaerythritol condensate A, hereinafter), a compound wherein m=1, a=3, and b=3 (to be referred to as special pentaerythritol condensate B, hereinafter), a compound wherein m=1, a=6, and b=0 (to be referred to as special pentaerythritol condensate C, hereinafter), and a compound wherein m=2, a=6, and b=0 (to be referred to as special pentaerythritol condensate D, hereinafter).

Also included are special acrylates represented by the following general formulae:

(Special acrylate A)   1)

(Special acrylate B)   2)

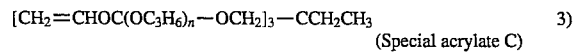
(Special acrylate C)   3)

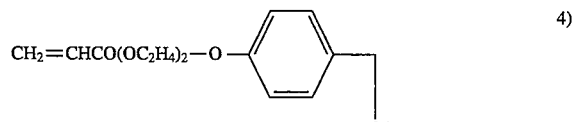
4)

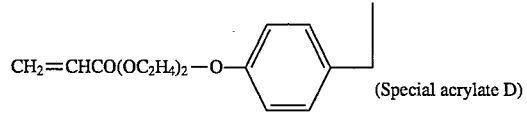
(Special acrylate D)

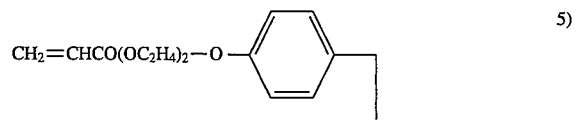
5)

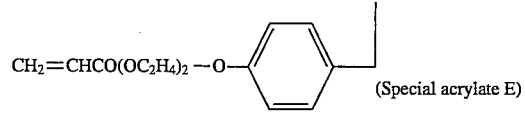

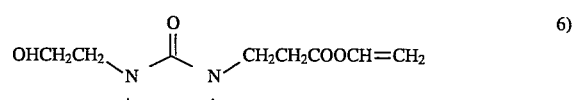
(Special acrylate E)

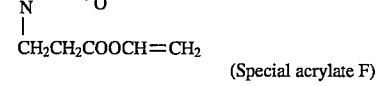
6)

(Special acrylate F)

-continued $$CH_3-(CH_2)_n-COOCH_2-\underset{\underset{CH_2COOCH=CH_2}{|}}{\overset{\overset{CH_2COOCH=CH_2}{|}}{C}}-CH_2OH \quad 7)$$
(n~16)

(Special acrylate G)

$$CH_2=CHCOO-(CH_2CH_2O)_4-COCH=CH_2 \quad 8)$$
(Special acrylate H)

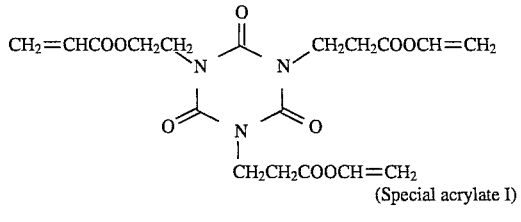

(Special acrylate I)

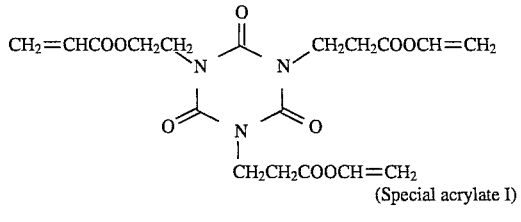

(Special acrylate J)

Examples of the radiation-curable oligomers include acryl modified urethane elastomers and their derivatives having a functional group such as COOH incorporated therein.

In addition to or instead of the above-mentioned compounds, radiation-curable compounds obtained by modifying thermoplastic resins so as to be radiation sensitive may be used. Examples of such radiation-curable resins include thermoplastic resins having incorporated in their molecule a group capable of crosslinking or polymerization upon exposure to radiation, for example, an acrylic double bond as given by acrylic acid, methacrylic acid and their esters having a radically polymerizable unsaturated double bond, an allyl double bond as given by diallyl phthalate, and an unsaturated bond as given by maleic acid and maleic derivatives.

Examples of the thermoplastic resins which can be modified to be radiation curable include vinyl chloride copolymers, saturated polyester resins, polyvinyl alcohol resins, epoxy resins, phenoxy resins, and cellulosic derivatives.

Other resins which can be modified to be radiation curable include polyfunctional polyesters, polyether ester resins, polyvinyl pyrrolidone resins and derivatives thereof (e.g., PVP olefin copolymers), polyamide resins, polyimide resins, phenolic resins, spiroacetal resins, and acrylic resins containing at least one acryl ester and methacryl ester containing a hydroxyl group as a polymerizing component.

The protective layer of such a radiation-curable compound preferably has a thickness of from about 0.1 to 30 μm, more preferably from about 1 to 10 μm. A protective layer of thinner than 0.1 μm is often difficult to form uniformly and insufficient as a moisture barrier in a humid atmosphere so that the underlying recording layer becomes less durable. Jitter prevention also becomes insufficient. A protective layer thicker than 30 μm tends to invite distortion of the overall recording medium and cracking of the protective layer itself due to shrinkage upon curing.

The protective layer may be formed by any desired well-known technique, for example, spinner coating, gravure coating, spraying, dipping, and combinations thereof. The conditions under which the protective layer is formed may be determined by taking into account the viscosity of a coating composition, the desired coating thickness, and other factors without undue experimentation.

The radiation to which the coating is exposed may be ultraviolet (UV) radiation, electron radiation, or the like, with UV being preferred.

Where UV is used, a photopolymerization sensitizer is generally added to the radiation-curable compounds. The photopolymerization sensitizer used herein is preferably a compound of formula (V) shown below. Addition of this compound to a polyfunctional oligoester acrylate facilitates formation of a film having a hardness within the above-defined range and excellent physical properties. The resulting film firmly adheres to the underlying reflective layer or adhesive layer (to be described later) and improves durability and humidity resistance.

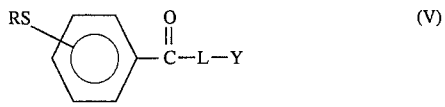

In formula (V), R is a substituted or unsubstituted alkyl group having 1 to 4 carbon atoms, for example, a methyl, ethyl, propyl, and butyl group, with the methyl and ethyl groups being preferred;

L is a substituted or unsubstituted alkylene group having 1 to 3 carbon atoms, for example,

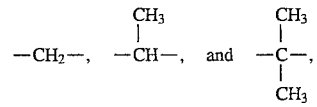

with the last one being preferred; and

Y is a heterocyclic group, for example, a morpholino, 2-morpholino, piperidino, 4-piperidinyl, 2-pyridyl, 2-quinolyl, 1-pyrrolidinyl, 1-pyrrolyl, 2-thienyl, and 2-furyl group, with the morpholino group being preferred.

In formula (V), RS— may be attached to the benzene ring at any of its substitutable positions, but preferably at the para-position with respect to the —CO—L—Y group.

Most preferred among the compounds of formula (V) is the following compound.

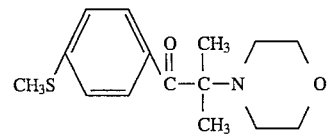

This compound is commercially available as IRGACURE 907 from Japan Ciba Geigy K.K.

The compounds of formula (V) act as photopolymerization initiators or sensitizers upon radiation curing.

These compounds are preferably contained in an amount of 0.1 to 20% by weight, more preferably 1 to 10% by weight in the organic protective coating composition. Less than 0.1% is insufficient to initiate or sensitize photopolymerization whereas in excess of 20%, some initiator or sensitizer is left unconsumed which will penetrate into and adversely affect the recording layer.

As the photopolymerization sensitizer, any well-known compounds may be used in combination with the compounds of formula (V) if desired. Such known compounds include benzoins such as benzoin methyl ether, benzoin ethyl ether, α-methylbenzoin, and α-chlorodeoxybenzoin, ketones such as benzophenone, acetophenone, and bisdialkylaminobenzophenone, quinones such as anthraquinone and phenanthraquinone, and sulfides such as benzyl disulfide and tetramethylthiuram monosulfide.

A coating containing a radiation-curable compound and a photopolymerization sensitizer as defined above may be cured with radiation by any well-known methods. For example, UV lamps such as xenon discharge lamps and hydrogen discharge lamps are used. If desired, electron radiation may be used.

On the protective film, an additional protective film in the form of a resinous layer or sheet may be formed.

Jitter preventing film

A jitter preventing film may be provided on the reflective layer 4 and/or between the recording layer 3 and the reflective layer 4, though not shown in FIG. 1.

The jitter preventing film may be a plasma-polymerized film or an inorganic thin film. Although the jitter preventing film formed on the reflective layer can also function as the protective film, it is also contemplated to form another protective layer (as defined above) on the jitter preventing film.

The jitter preventing film preferably has a thickness of at least 0.05 μm, more preferably 0.1 to 10 μm. Too thin films are ineffective in preventing jitter whereas too thick films fail to meet the CD standard and provide no additional benefit at an increased cost.

The plasma-polymerized film may be any of well-known plasma-polymerized films. Most often, it is based on carbon and may contain H, O and a halogen such as Cl and F or other elements such as Si and N. The source gases and conditions used in plasma polymerization may be chosen according to well-known techniques. Since the plasma-polymerized film is substantially transparent, it may be formed either above or below the reflective layer.

The inorganic thin film may be formed from various inorganic compounds such as oxides, nitrides, carbides, silicides and mixtures thereof.

Adhesive layer

An adhesive layer may be provided between the recording layer 3 and the reflective layer 4 in close contact with both the layers, though not shown in FIG. 1.

The adhesive layer preferably contains a hydrolysis condensate of an organic silicate compound, organic titanate compound, organic aluminate compound, or organic zirconate compound or a hydrolysis condensate of a Si, Ti, Al or Zr halide.

The organic titanate compounds used herein may be selected from various well-known compounds, for example, alkyltitanate esters, substituted alkyltitanate esters, alkenyltitanate esters, and substituted alkenyltitanate esters.

The organic zirconate compounds used herein may be selected from various well-known compounds, for example, alkylzirconate esters, substituted alkylzirconate esters, alkenylzirconate esters, and substituted alkenylzirconate esters.

The organic aluminate compounds used herein may be selected from various well-known compounds, for example, aluminum alkoxides and aluminum chelates.

Among these compounds, compounds having the following structural formulae are particularly preferred.

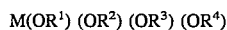

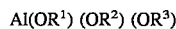

In the formulae, M is Ti or Zr, and $R^1$, $R^2$, $R^3$, and $R^4$ are independently selected from the class consisting of a hydrogen atom, a substituted or unsubstituted alkyl group, and a substituted or unsubstituted alkenyl group. Preferably, at least two of $R^1$ to $R^4$ are alkyl or alkenyl groups rather than hydrogen atoms. The substituted or unsubstituted alkyl or alkenyl groups preferably have 2 to 18 carbon atoms. The substituents on the alkyl or alkenyl groups include a carboxyl group, an alkylcarboxyl group, a substituted amino group such as a di(hydroxyalkyl)amino group, a hydroxyl group, and an alkyloxycarbonyl group.

Illustrative examples of the organic titanate compounds are given below.

| T1 | Tetraethyl titanate |
| T2 | Tetrapropyl titanate |
| T3 | Tetraisopropyl titanate |
| T4 | Tetra(n-butyl) titanate |
| T5 | Tetra(isobutyl) titanate |
| T6 | Tetra(sec-butyl) titanate |
| T7 | Tetra(tert-butyl) titanate |
| T8 | Tetra(2-ethylhexyl) titanate |
| T9 | Tetrastearyl titanate |
| T10 | Hydroxytitanium stearate |
| T11 | Isopropoxytitanium stearate |
| T12 | Hydroxytitanium oleate |
| T13 | Isopropoxytitanium oleate |
| T14 | Di-i-propoxy bis(acetylacetone) titanate |
| T15 | Di-n-butoxy bis(triethanolamine) titanate |
| T16 | Dihydroxy bis(lactic acid) titanate |
| T17 | Tetraoctylene glycol titanate |
| T18 | Di-i-propoxy bis(ethyl acetoacetate) titanate |

Illustrative examples of the organic zirconate compounds include tetra-n-propyl zirconate, tetra-i-propyl zirconate, tetra-n-butyl zirconate, tetra-i-butyl zirconate, zirconium tetraacetylacetonate, zirconium 2-ethylhexoate, zirconium naphthenate, and diacetate zirconate.

Illustrative examples of the organic aluminate compounds include aluminum isopropylate, mono-sec-butoxy aluminum diisopropylate, aluminum sec-butyrate, ethylacetoacetate aluminum diisopropylate, and aluminum ethylacetoacetate.

Illustrative examples of the organic silicate compounds include alkyl silicates, especially tetra(lower alkyl) silicates such as tetramethyl silicate and tetraethyl silicate.

The organic titanate compound, organic zirconate compound, organic aluminate compound, or organic silicate compound may form an oligomer or colloidal condensed oxide in a coating composition.

The halides used herein include silicon halides, especially silicon tetrachloride.

An adhesive layer is formed from the organic titanate compound, organic zirconate compound, organic aluminate compound, organic silicate compound or halide as enumerated above by diluting the compound with a solvent such as water, alcohol, hexane, and benzene or a solvent mixture, applying the dilution onto the recording or dye layer, and allowing the coating to stand for hydrolysis to take place, thereby forming a condensate. The application of the adhesive layer is not particularly limited and spin coating is a typical application method.

The adhesive layer preferably has a thickness of about 10 to 300Å, more preferably 20 to 100Å. Thinner layers are optically non-uniform and offer less bond strength whereas thicker layers can alter optical properties, that is, adversely affect reflectivity and modulation factor.

Operation

Recording or additional recording may be carried out on the optical recording medium 1 of the above-described construction by directing recording light having a wavelength of 780 nm, for example, in pulse form to the recording layer 3 in the groove 23 through the substrate 2 to form a pit 6. The recording layer 3 absorbs light so that it is heated while the substrate 2 is heated at the same time. As a result, the recording material, typically dye melts or decomposes near the interface between the substrate 2 and the recording layer 3, applying a pressure to the interface between the substrate 2 and the recording layer 3 to deform the bottom and side walls of the groove 23.

The melted or decomposed product of the recording material finds no place to go because of the tightly sealed relationship. A portion of the melted or decomposed product climbs over the land 21 and the majority remains on the bottom of the groove 23. As a result, the decomposed product of the recording material forms a layer 61 which covers the groove 23 over its bottom to the boundary between the groove 23 and the land 21. The decomposed layer 61 consists essentially of the decomposed product of the recording material or a mixture of the decomposed product of the recording material and the recording material, but does not substantially contain the substrate material.

The decomposed layer 61 generally has a thickness of about 30 to 90% of the thickness of the recording layer 3.

The pit 6 generally includes an empty space 63 which is formed above the decomposed layer 61 and below the interface between the original recording layer 3 and the reflective layer 4. The space 63 generally has a thickness of about 10 to 70% of the thickness of the recording layer 3. Therefore, the pit 6 consists of the decomposed layer 61 and the space 63.

During the recording step described above, the substrate 2 does not undergo deformation in some cases, but in most cases, the substrate 2 is depressed into a recess at the pit 6 under the pressure induced upon heating. The depression of the substrate 2 is increased with the size of the pit 6 and is generally 0 to 300Å deep.

In some cases, a fraction of the recording material or its decomposed product in an extremely thin film form can remain adhered to the reflective layer 4 above the space 63.

In this way, the layer 61 substantially free of the substrate material is formed in the pit 6 at the interface between the substrate 2 and the recording layer 3.

The inventors have found that the pit 6 between the substrate 2 and the recording layer 3 does not substantially contain the substrate material. An optical recording disk was fabricated by applying a recording layer 3, a reflective layer 4, and a protective layer 5 on a substrate 2 under predetermined conditions, and then recorded by directing a laser beam. Several samples were cut out from the disk, and the protective and reflective layers 5 and 4 were removed therefrom. The exposed surface of the substrate 2 was cleaned with alcoholic solvent under two sets of cleaning conditions. One set of cleaning conditions was a mild cleaning wherein the sample was mildly shaken in the alcoholic solvent, and the other set was an intense ultrasonic cleaning. After cleaning, an output image of the cleaned substrate surface was taken under a scanning tunneling microscope (STM). The thickness of the groove in the substrate was measured from the output image.

In the samples subjected to ultrasonic cleaning, the pit 6 was flat or depressed. In the samples subjected to mild cleaning, the pit 6 was raised on the substrate 2. These observations suggest that the raised pit 6 in the mildly cleaned samples resulted from decomposition of the recording material, typically dye upon receipt of heat, that is, it is a layer of a decomposed product of the recording material having a reduced solubility.

In fact, the residue after mild cleaning was analyzed by liquid chromatography, absorption spectroscopy, Fourier transform infrared spectroscopy (FTIR), or MAS to find that the decomposed product was present, but the substrate material was absent at the pit bottom.

The pit forming mechanism occurring in the present invention is different from the pit forming mechanism disclosed in Nikkei Electronics, Jan. 23, 1989, No. 465, page 107, that a recording laser beam is directed to a dye layer whereupon the dye layer melts or decomposes and the substrate also softens due to light absorption so that the dye material and the substrate material intermix at their interface to form a pit thereat.

The pit formed of the decomposed product of the recording material, but substantially free of the substrate material is well defined in shape, resulting in an increased S/N ratio.

It is to be noted that the recording light has a power of about 5 to 9 mW while the substrate is rotated at a linear velocity of about 1.2 to 1.4 m/sec.

After the pit 6 is formed in this way, reproducing light having a wavelength of 780 nm and a power of about 0.1 to 1.0 mW is directed to the pit 6 through the substrate 2. The pit causes a phase difference to reduce the reflectivity to not greater than 60%, preferably not greater than 50%, more preferably not greater than 40% of the reflectivity of unrecorded portions. In turn, the remaining recording layer, that is, the unrecorded portions maintain a high reflectivity of at least 60%, especially at least 70%. This differential reflectivity enables reproduction according to the CD standard.

The reproducing light is of the same wavelength as the recording light and has a power of about 0.1 to 10 mW.

EXAMPLE

Examples of the present invention are given below by way of illustration and not by way of limitation.

Example 1

A recording layer consisting essentially of a mixture of dyes D1 and D2 was formed on a polycarbonate substrate having a continuous spiral groove and a diameter of 120 mm and a thickness of 1.2 mm. Gold was vacuum deposited on the recording layer to form a reflective layer having a thickness of 1,000Å. Further, a UV-curable resin composition containing an oligoester acrylate was coated on the reflective layer and UV cured to form a protective layer having a thickness of 5 μm, completing an optical recording disk sample.

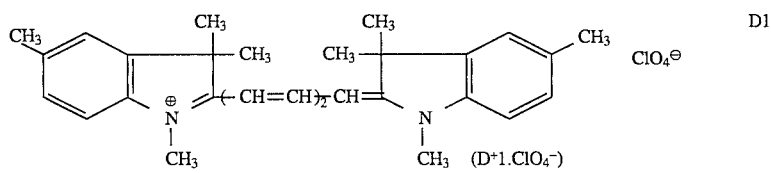

-continued

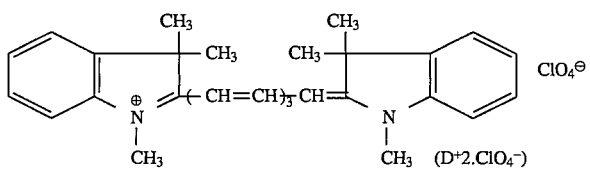

D2

The recording layer was formed by spin coating a coating solution while the substrate was rotated at 500 r.p.m. The coating solution was a 1.5 wt % methanol solution of dyes D1 and D2. The dye layer was 1,300Å thick at the end of drying.

The dyes and their proportion in the recording layer are shown in Table 1 together with the index of refraction (n) and coefficient of extinction (k) of the recording layer.

The index of refraction (n) and coefficient of extinction (k) of the recording layer were determined by applying a solution of a dye onto a test substrate to a dry thickness of 600Å and measuring the n and k of the resulting recording layer. The measurement was made according to K. Ishiguro, "Optics," Kyoritsu Publishing K.K., pages 168–178. In the measurement of the recording layer of dyes D1 and D2, the solvent was methanol and the test substrate was a polycarbonate substrate.

TABLE 1

| Sample No. | Dye (wt %) | n | k |
| --- | --- | --- | --- |
| 1 | D1 (90) + D2 (10) | 2.4 | 0.10 |

The protective layer was formed by spinner coating a coating composition containing a radiation-curable compound and a photopolymerization sensitizer. That is, the coating composition contained 100 parts by weight of a polyfunctional oligoester acrylate consisting of 30% by weight of trifunctional or more oligoester acrylate and 70% by weight of trimethylpropane acrylate available as Aronix M-8030 from Toa Synthesis K.K. and 5 parts by weight of a photopolymerization sensitizer available as IRGACURE 907 from Japan Ciba Geigy K.K. The coating was exposed to UV radiation at 120 W/cm for 15 seconds, thereby crosslinking and curing the coating into a cured film having a thickness of 5 μm and a pencil hardness of 2H.

CD signals were recorded in the sample disk using a laser beam having a wavelength of 780 nm and a power of 7 mW. Then reproduction was carried out with a commercial CD player. Disk sample No. 1 permitted satisfactory reproduction at a high S/N ratio.

Two sample pieces were cut out from disk sample No. 1. The protective and reflective layers were removed from the samples and then the exposed substrate surface was cleaned for 2 minutes with methanol under two different sets of conditions. Sample No. 1-1 was mildly cleaned by lightly shaking the sample in methanol. Sample No. 1-2 was intensely cleaned by ultrasonic cleaning.

After cleaning, a gold film of 100Å thick was formed on the substrate surface by sputtering. The surface state of the samples was imaged using a scanning tunneling microscope (STM) manufactured by Toyo Technica K.K.

Figure 2:
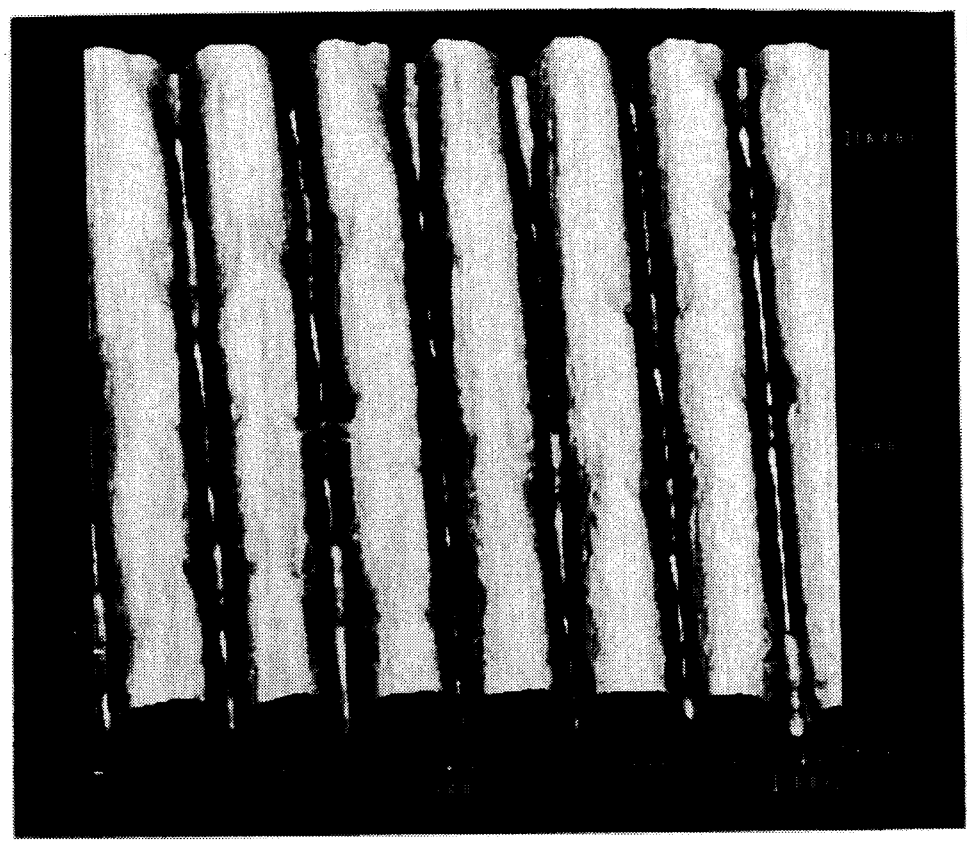
FIGS. 2 and 3 are photographs under a scanning tunnel microscope of the grooved substrate surface of optical recording disk pieces in Example 1 from which the recording layer has been partially or completely washed away.
Figure 3:
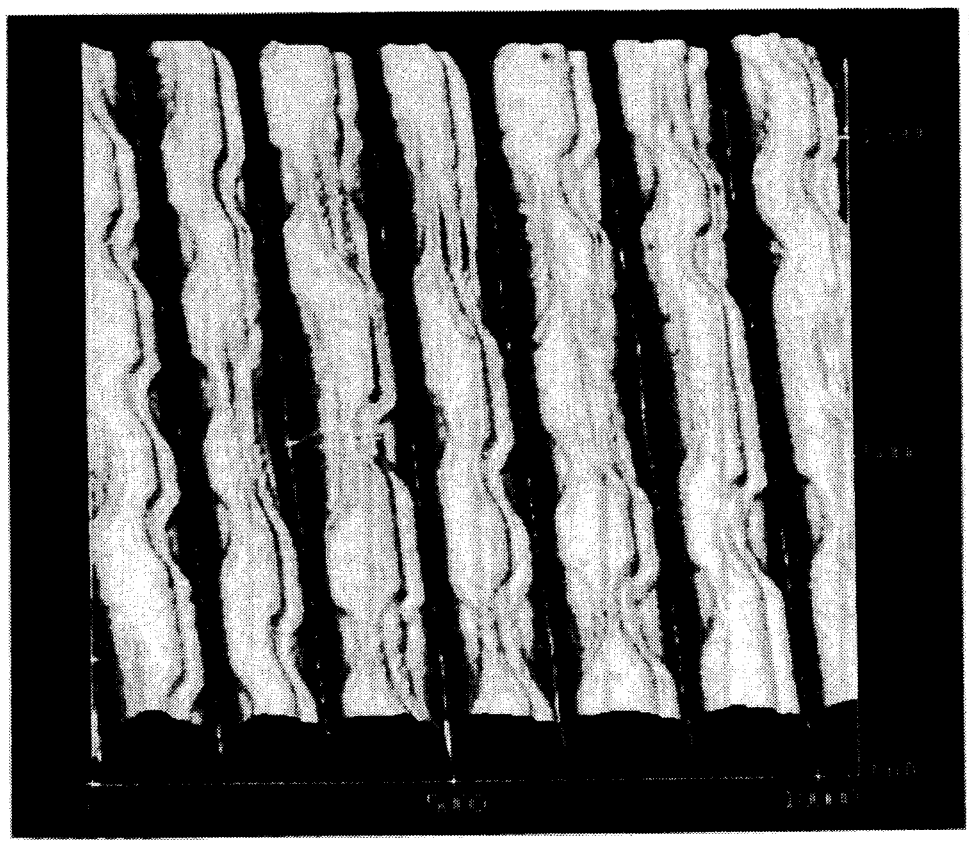

FIGS. 2 and 3 are STM images of sample Nos. 1-1 and 1-2, respectively. As seen from these images, sample No. 1-1 subject to mild cleaning had a film of a substantial thickness at pits in the groove. Sample No. 1-2 subject to intense cleaning had a film of a substantially uniform thickness left in the groove.

Figure 4:
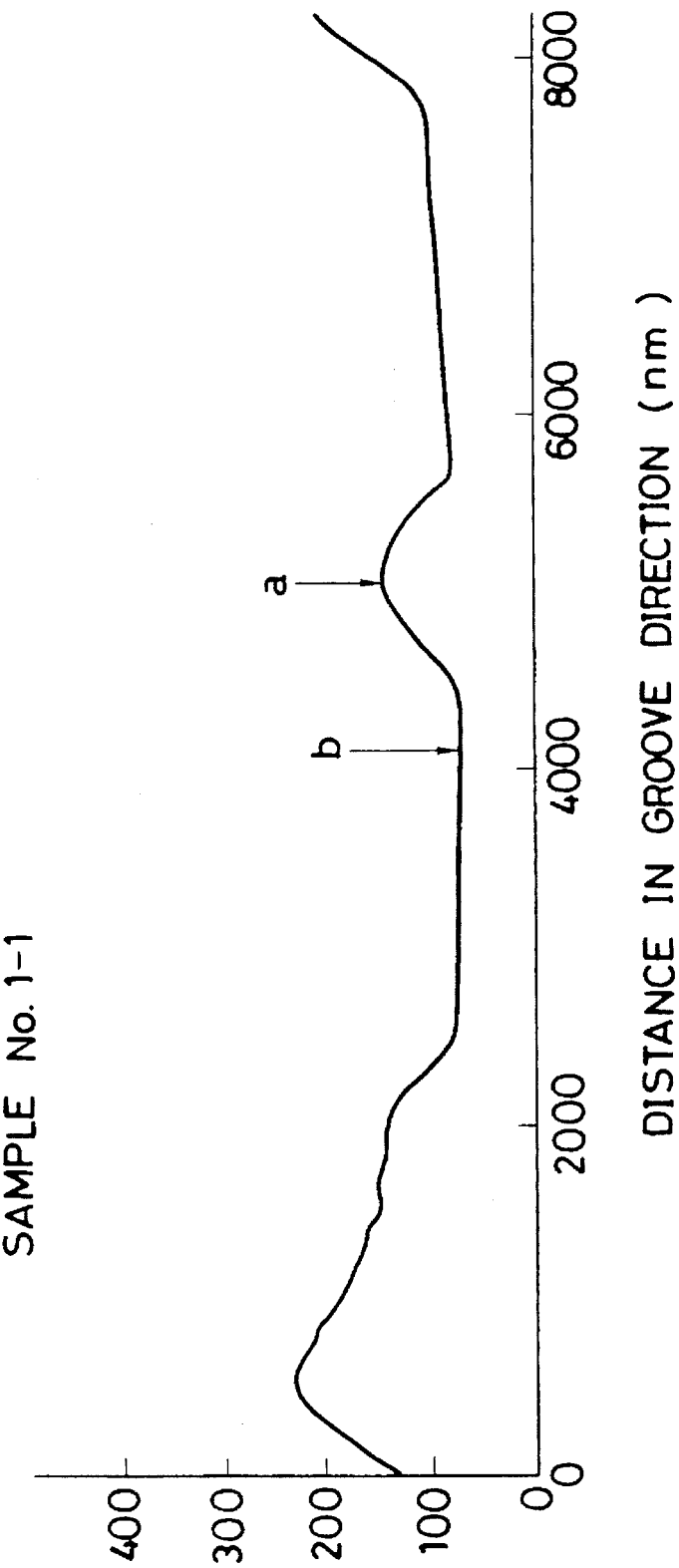
FIGS. 4 and 5 are diagrams showing the surface profile along a groove of the substrate of optical recording disk pieces in Example 1 from which the recording layer has been partially or completely washed away.
Figure 5:
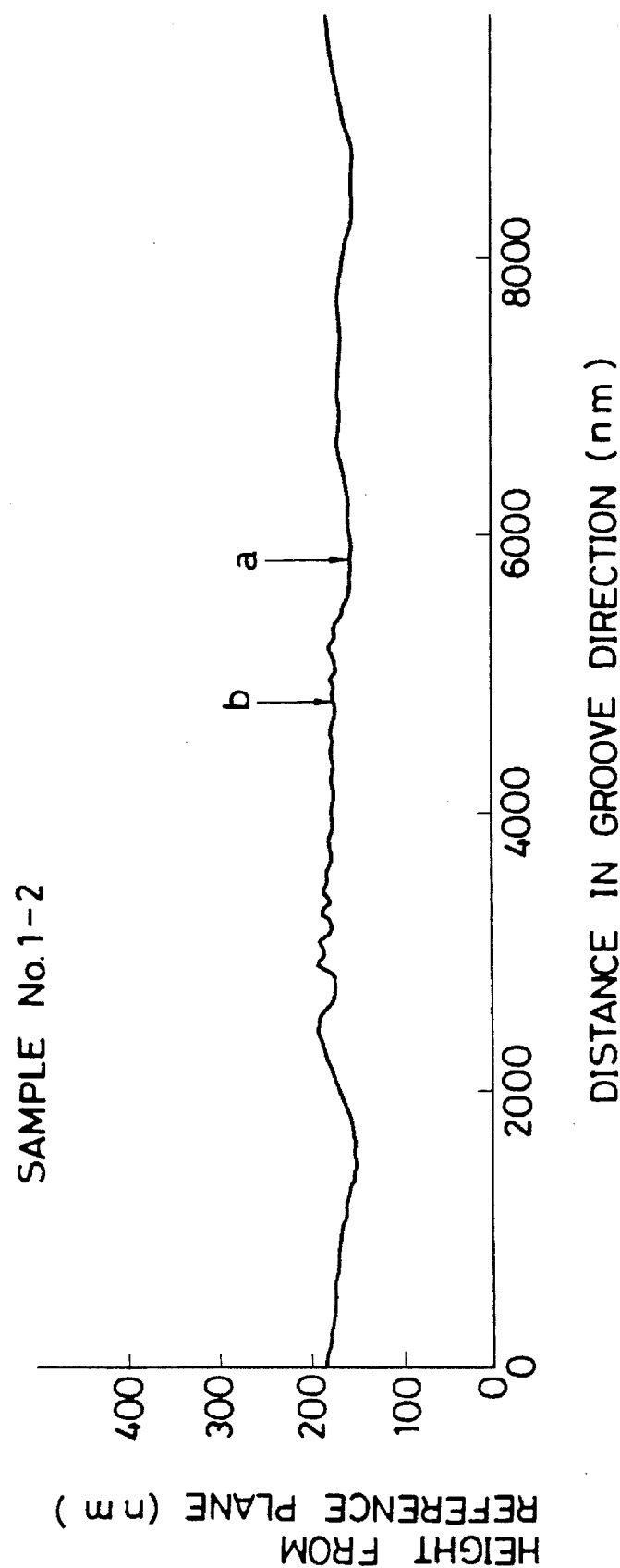

To accurately observe the thickness of the film in the groove, the surface state of the sample was determined in a cross section along the groove. FIGS. 4 and 5 are diagrams showing the surface profile of sample Nos. 1-1 and 1-2, respectively. A height from a reference plane in the substrate thickness direction is on the ordinate and a distance along the groove direction is on the abscissa. In the diagrams, arrow a designates a pit (or a recorded region) and arrow b designates an (unrecorded) region outside the pit.

As seen from FIG. 4, the pit shown by arrow a is raised in sample No. 1-1 subject to mild cleaning. In turn, FIG. 5 shows that the pit shown by arrow a is somewhat depressed in sample No. 1-2 subject to intense cleaning.

The portion appearing raised in the profile of sample No. 1-1 is deemed to result from decomposition of the dyes upon receipt of heat, that is, a decomposed layer consisting essentially of a decomposed product of the dyes having a reduced solubility.

The layer formed along the interface between the substrate and the recording layer at the pit was removed by ultrasonic processing and analyzed to find the presence of decomposed products and the substantial absence of the substrate material.

Additional recording layers were formed using dyes D1 and D2 separately as shown in Table 2.

TABLE 2

| Sample No. | Dye (wt %) | n | k |
| --- | --- | --- | --- |
| 1-3 | D1 (100) | 2.4 | 0.02 |
| 1 | D1 (90) + D2 (10) | 2.4 | 0.10 |
| 1-4 | D2 (100) | 2.3 | 1.35 |

CD signals were recorded in each of the sample disks using a laser beam having a wavelength of 780 nm and a power of 7 mW. Then reproduction was carried out with a commercial CD player.

Although disk sample No. 1 permitted satisfactory reproduction at a high S/N ratio as previously reported, sample No. 1-3 showed a small difference in reflectivity between recorded and unrecorded portions and sample No. 1-4 was impossible to reproduce due to low reflection.

Next, benefits attributable to the addition of a quencher according to the present invention are demonstrated using sample No. 1. Disk sample Nos. 2 to 4 were prepared by the same procedure as sample No. 1 except that a quencher was added to the dye mixture from which the recording layer was formed.

The quenchers of formula (I) used were Q1 and Q6.

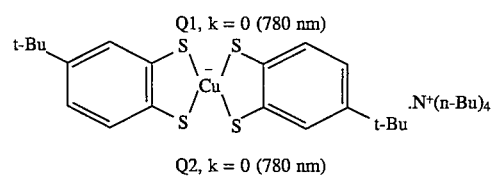

Q1, k = 0 (780 nm)

Q2, k = 0 (780 nm)

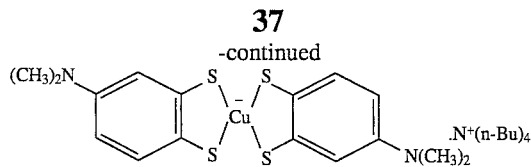

-continued

The samples were subjected to recording and reproducing operations as above.

It was found that the same pits as in sample No. 1 were formed in these disk samples.

In these disk samples, the unrecorded portion provided a reflectivity of greater than 70%. The reflectivity of the recorded portion for 11T pulse CD signals was up to 40% of the reflectivity of the unrecorded portion. Therefore, the recording and reproducing operation was satisfactory.

In addition, the samples were exposed to a Xe lamp of 1.5 kW spaced 15 cm through the substrate for 20 hours. The percent retention of the dye was calculated according to $$(100-R)/(100-R0) \times 100$$

wherein R0 and R are the reflectivity at 780 nm at the initial and at the end of exposure.

The results are shown in Table 3.

As seen from Table 3, the quenchers used herein, due to low k, can be added in increased amounts while maintaining the desired k and reflectivity of the recording layer. The samples having the quenchers added showed satisfactory recording/reproducing performance and light resistance.

Further, disk samples Nos. 2 to 4 were measured for jitter using a CD jitter meter MJM-631 manufactured by Megufo K.K. The jitter was as low as 100 ns or less.

Equivalent results were obtained from mixtures of a quencher and a light absorbing dye within the scope of the present invention.

Example 2

A disk sample, No. 11 was fabricated by the same procedure as in Example 1 except the dye was replaced by dye D3.

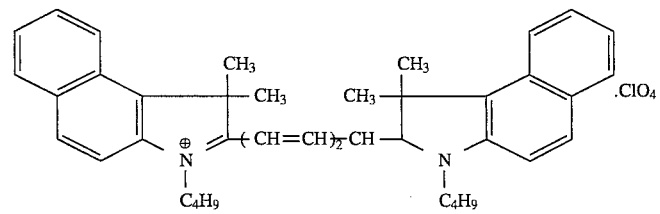

Additional samples, Nos. 12 and 13, were fabricated as above, but adding present quencher Q1 and comparative quencher Q51 to the dye, respectively.

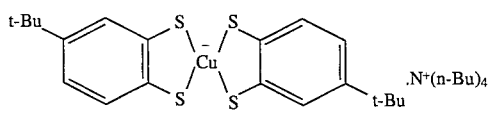

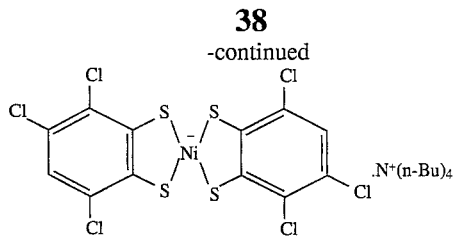

The results are shown in Table 4.

As seen from Table 4, sample No. 13 using a nickel complex quencher for comparison purpose had a too low reflectivity of less than 60% to reproduce signals.

In contrast, sample Nos. 11 and 12 showed a reflectivity of not less than 70% like sample No. 1, had pits formed as in sample No. 1, and were satisfactory in recording/reproducing operation without jitter. Sample No. 12 showed significantly high light resistance.

Example 3

A disk sample, No. 21 was fabricated by the same procedure as in Example 1 except that the recording layer was formed from a mixture of dye D3, dye D14, and quencher Q1.

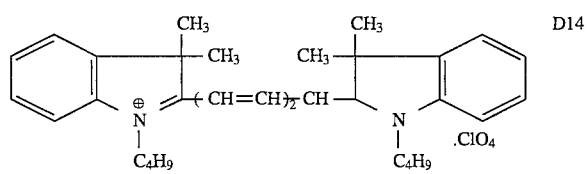

The results are shown in Table 5 together with the results of sample No. 12.

As seen from Table 5, sample No. 21 showed a reflectivity of not less than 70% like sample No. 1, pits formed as in sample No. 1, satisfactory recording/reproducing operation without jitter, and significantly higher light resistance.

TABLE 3

| Sample | Dye (wt %) | | Quencher | | | | Dye retention (%) | Reflectivity (%) |
|---|---|---|---|---|---|---|---|---|
| No. | D1 | D2 | Type | wt % | n | k | | |
| 1* | 90 | 10 | — | 0 | 2.4 | 0.10 | 8 | ≧70 |
| 2 | 81 | 9 | Q1 | 10 | 2.2 | 0.10 | 65 | ≧70 |
| 3 | 72 | 8 | Q1 | 20 | 2.1 | 0.09 | 78 | ≧70 |
| 4 | 72 | 8 | Q6 | 20 | 2.2 | 0.09 | 80 | ≧70 |

*comparison

TABLE 4

| Sample No. | Dye (wt %) | | Quencher (wt %) | | Dye retention (%) | Reflectivity (%) |
|---|---|---|---|---|---|---|
| 11* | D3 | 100 | | | 10 | ≧70 |
| 12 | D3 | 80 | Q1 | 20 | 75 | ≧70 |
| 13* | D3 | 80 | Q51 | 20 | 73 | <60 |

*comparison

TABLE 5

| Sample No. | Dye (wt %) | | Quencher | | | Dye retention (%) | Reflectivity (%) |
|---|---|---|---|---|---|---|---|
| | D3 | D14 | Q1 (wt %) | n | k | | |
| 12 | 80 | 0 | 20 | 2.7 | 0.08 | 75 | ≧70 |
| 21 | 60 | 30 | 20 | 2.6 | 0.07 | 73 | ≧70 |

The following examples are to demonstrate the benefits of a dye-quencher ionic combination according to the present invention.

Example 4

The procedure of sample No. 1 in Example 1 was basically followed. Disk sample No. 201 was prepared by the same procedure as sample No. 1 except that a mixture of combinations C1 and C2 was used.

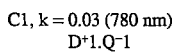
C1, k = 0.03 (780 nm)
$D^+1 \cdot Q^-1$

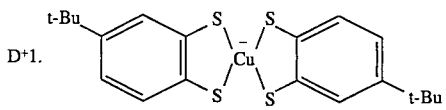
D+1.

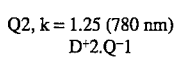
Q2, k = 1.25 (780 nm)
$D^+2 \cdot Q^-1$

Sample No. 201 (a mixture of dye-quencher ionic combinations C1 and C2) was compared with sample No. 1 (a mixture of dyes D1 and D2) and No. 2 (a mixture of dyes D1 and D2 plus quencher Q1). The samples were subjected to recording and reproducing operations as in Example 1.

It was found that the same pits as in sample No. 1 were formed in disk sample No. 201.

In these disk samples, the unrecorded portion provided a reflectivity of greater than 70%. The reflectivity of the recorded portion for 11T pulse CD signals was up to 40% of the reflectivity of the unrecorded portion. Therefore, the recording and reproducing operation was satisfactory.

The percent dye retention was calculated after a Xe lamp exposure (1.5 kW, 20 hours) as in Example 1 and reported under the heading of "light resistance" in Table 6.

Furthermore, the samples were stored for 250 hours at 70° C. and RH 10% and 500 hours at 60° C. and RH 90%. After storage, the samples were reproduced to evaluate heat and moisture resistance. Evaluation was made according to the following criterion.

○: no error increase

△: some error increase

X: error increase

The results are shown in Table 6.

As seen from Table 6, the recording layer based on the combinations according to the invention showed satisfactory recording/reproducing performance while maintaining the desired n, k and reflectivity. It was prominent in light resistance, heat resistance and moisture resistance as compared with the mix systems.

Further, disk sample No. 201 was measured for jitter using a CD jitter meter MJM-631. The jitter was as low as 100 ns or less.

TABLE 6

| Sample No. | Dye (wt %) | n | k | Reflectivity (%) | Resistance against | | |
|---|---|---|---|---|---|---|---|
| | | | | | Light | Heat | Moisture |
| 1 | D1(90) + D2(10) | 2.4 | 0.10 | ≧70 | 8% | △ | △ |
| 201 | C1(90) + C2(10) | 2.2 | 0.09 | ≧70 | 88% | ○ | ○ |
| 2 | D1(81) + D2(9) + Q1(10) | 2.2 | 0.10 | ≧70 | 65% | X | △ |

TABLE 7

| Sample No. | Dye (wt %) | n | k | Reflectivity (%) | Resistance against | | |
|---|---|---|---|---|---|---|---|
| | | | | | Light | Heat | Moisture |
| 211 | C3(100) | 2.7 | 0.11 | ≧70 | 91% | ○ | ○ |
| 212 | C6(100) | 2.8 | 0.12 | ≧70 | 90% | ○ | ○ |
| 213 | C21(60) + C11(40) | 2.4 | 0.06 | ≧70 | 89% | ○ | ○ |
| 221 | C'6(100) | 2.9 | 1.8 | <60 | 91% | — | — |

Example 5

Sample Nos. 211 to 213 and 221 were prepared by the same procedure as in Example 4 except that the following combinations were used to form a recording layer of the composition shown in Table 7.

C3: $D^+3 \cdot Q^-1$

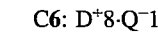
C6: $D^+8 \cdot Q^-1$

C21: $D^+3 \cdot Q^-5$

C11: $D^+26 \cdot Q^-1$

Sample No. 221 was a comparative sample using combination C'6 which was a modification of combination C6 with its quencher anion changed from a copper complex to a nickel complex.

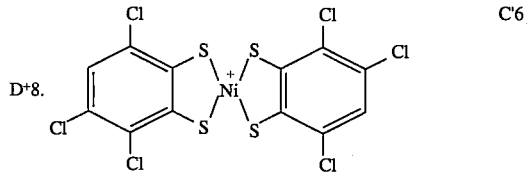
D+8.

The results are shown in Table 7.

Also, sample Nos. 211 to 213 were found to have the same pits formed as in sample No. 1 and ensure better recording/reproducing operation without jitter. Sample No. 221 had a reflectivity of less than 60% which was too low for reproduction.

The following examples are to demonstrate the benefits of a heteronuclear indolenine cyanine dye according to the present invention.

Example 6

The procedure of sample No. 1 in Example 1 was basically followed. Disk sample Nos. 301 to 304 were prepared by the same procedure as sample No. 1.

The heat resistance was determined by storing the samples for 500 hours at 70° C. and RH 10% and thereafter measuring an increase in C1 error and evaluated in three ratings of "○" for no error increase, "Δ" for some error increase, and "X" for an error increase.

The results are shown in Table 8.

As seen from Table 8, the recording layers based on the heteronuclear dye were least dependent on wavelength, significantly improved in heat resistance as compared with the dye mixture system. It was also found that the use of a mixture of two or more heteronuclear dyes minimized the wavelength dependency.

TABLE 8

| Sample No. | Dye (wt %) | n 770 | n 780 | n 790 | k 770 | k 780 | k 790 | mp (°C.) | Heat resistance |
|---|---|---|---|---|---|---|---|---|---|
| 1 | D1(90) + D2(10) | 2.6 | 2.5 | 2.4 | 0.10 | 0.08 | 0.07 | ≈150 broad | X |
| 302 | D31(70) + D3(30) | 2.9 | 2.7 | 2.7 | 0.10 | 0.06 | 0.04 | ≈130 broad | X |
| 303 | Dh1(100) | 2.4 | 2.5 | 2.8 | 0.04 | 0.04 | 0.06 | 262–264 | ○ |
| 304 | Dh8(100) | 2.6 | 2.8 | 2.8 | 0.04 | 0.06 | 0.09 | 230–235 | ○ |

TABLE 9

| Sample No. | Dye (wt %) | n 770 | n 780 | n 790 | k 770 | k 780 | k 790 | Light resistance, dye retention |
|---|---|---|---|---|---|---|---|---|
| 311 | Dh1(80) + Q1(20) | 2.4 | 2.5 | 2.5 | 0.04 | 0.05 | 0.09 | 78% |

TABLE 10

| Sample No. | Dye (wt %) | n 770 | n 780 | n 790 | k 770 | k 780 | k 790 | Light | Heat | Moisture |
|---|---|---|---|---|---|---|---|---|---|---|
| 312 | Dh24(100) | 2.5 | 2.5 | 2.6 | 0.10 | 0.06 | 0.06 | 95% | ○ | ○ |

Sample No. 1 used a mixture of 90 wt % of D1 and 10 wt % of D2, sample No. 302 used a mixture of 70 wt % of D31 and 30 wt % of D3, and sample Nos. 303 and 304 used heteronuclear indolenine cyanine dyes Dh1 and Dh8, respectively.

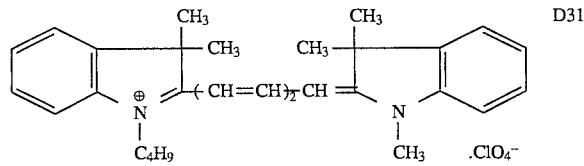

Sample Nos. 302 to 304 were compared with sample No. 1. The samples were subjected to recording and reproducing operations at 780 nm as in Example 1.

It was found that the same pits as in sample No. 1 were formed in disk sample Nos. 302 to 304.

In these disk samples, the unrecorded portion provided a reflectivity of greater than 70%. The reflectivity of the recorded portion for 11T pulse CD signals was up to 40% of the reflectivity of the unrecorded portion. Therefore, the recording and reproducing operation was satisfactory.

The samples were measured for n, k, melting point, and heat resistance.

Example 7

Sample No. 311 was prepared by the same procedure as in Example 6 except that a mixture of 80 wt % of heteronuclear dye Dh1 and 20 wt % of quencher Q1 was used.

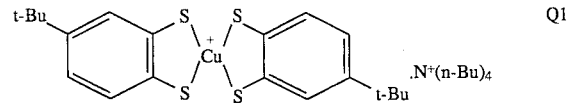

The sample was subjected to recording and reproducing operations as in Example 6.

It was found that the same pits as in sample No. 1 were formed in disk sample No. 311. In this disk sample, the unrecorded portion provided a reflectivity of greater than 70%. The reflectivity of the recorded portion for 11T pulse CD signals was up to 40% of the reflectivity of the unrecorded portion. Therefore, the recording and reproducing operation was satisfactory.

The percent dye retention was calculated after a Xe lamp exposure (1.5 kW, 20 hours) as in Example 1 and reported under the heading of "light resistance" in Table 9.

The results are shown in Table 9.

As seen from Table 9, the recording layer using a heteronuclear dye and a quencher has a desired value of k and is satisfactory in recording/reproducing properties and light resistance.

Example 8

Sample No. 312 was prepared by the same procedure as in Example 6 except that dye Dh24 was used. The sample was subjected to recording and reproducing operations as in Example 6.

It was found that the same pits as in sample No. 1 were formed in disk sample No. 312. In this disk sample, the unrecorded portion provided a reflectivity of greater than 70%. The reflectivity of the recorded portion for 11T pulse CD signals was up to 40% of the reflectivity of the unrecorded portion. Therefore, the recording and reproducing operation was satisfactory.

The percent dye retention was calculated after a Xe lamp exposure (1.5 kW, 20 hours) as in Example 1 and reported under the heading of "light resistance" in Table 10. The heat and moisture resistance were determined by storing the samples for 500 hours at 70° C. and RH 10% and at 60° C. and RH 90% and thereafter measuring an increase in C1 error and evaluated in three ratings of "O" for no error increase, "Δ" for some error increase, and "X" for an error increase.

The results are shown in Table 10.

As seen from Table 10, the recording layer using a ionic combination of a heteronuclear dye cation with a quencher anion has k which is less dependent on wavelength and is satisfactory in recording/reproducing properties and light resistance.

Further, disk sample Nos. 303, 304, 311 and 312 were measured for jitter using a CD jitter meter MJM-631. The jitter was as low as 100 ns or less.

According to the present invention, the recording layer containing a dye and a quencher as defined in the first form has high reflectivity in unrecorded areas and a substantial drop of reflectivity in pits, thus ensuring satisfactory optical recording and reproducing operation according to the CD standard. The pits are well configured to provide high S/N. The recording layer has high enough light resistance to prevent output lowering. There is obtained an optical recording medium capable of satisfactory recording/reproducing operation.

All these advantages are met by the recording layer containing a dye-quencher ionic combination as defined in the second form. In addition, high heat resistance and moisture or water resistance are achieved.

Furthermore, the wavelength dependency of recording/reproducing capability is minimized when a heteronuclear indolenine cyanine dye is used.

While the invention has been described with reference to preferred embodiments, it will be understood by those skilled in the art that various changes may be made and equivalents may be substituted for elements thereof without departing from the scope of the invention. Therefore, it is intended that the invention not be limited to the particular embodiments disclosed as the best mode contemplated for carrying out this invention, but that the invention will include all embodiments falling within the scope of the appended claims.

We claim:

1. An optical recording medium of the type wherein recording is carried out by directing recording light to a recording layer to form pits and reproduction is carried out by directing reproducing light to the recording layer, and comprising a substrate, a recording layer on the substrate and a reflective layer stacked close to the recording layer, said recording layer contains a light absorbing dye and a bisphenylenedithiol copper complex, said recording layer has an extinction coefficient k of 0.01 to 0.10 as measured at the wavelength of the recording and reproducing light, and said dye is a cyanine dye having a first indolenine ring in condensed or uncondensed form and a second indolenine ring in condensed or uncondensed form and different from said first indolenine ring.

2. The optical recording medium of claim 1 wherein an unrecorded portion of the recording layer has a reflectivity of at least 60% and a recorded portion of the recording layer has a reflectivity which is up to 40% of the reflectivity of the unrecorded portion when reproducing light is directed from the substrate side.

3. The optical recording medium of claim 1 wherein the wavelength of the recording and reproducing light is in the range of from 600 to 900 nm.

4. The optical recording medium of claim 1 wherein said recording layer contains at least two light absorbing dyes.

5. The optical recording medium of claim 1 wherein the recording layer contains another cyanine dye.

6. An optical recording medium of the type wherein recording is carried out by directing recording light to a recording layer to form pits and reproduction is carried out by directing reproducing light to the recording layer, and comprising a substrate, a recording layer on the substrate and a reflective layer stacked close to the recording layer, said recording layer contains an ionic combination of a cyanine dye cation and a bisphenylenedithiol copper complex anion, said recording layer has an extinction coefficient k of 0.01 to 0.10 as measured at the wavelength of the recording and reproducing light, and said cyanine dye having a first indolenine ring in condensed or uncondensed form and a second indolenine ring in condensed or uncondensed form and different from said first indolenine ring.

7. The optical recording medium of claim 6 wherein an unrecorded portion of the recording layer has a reflectivity of at least 60% and a recorded portion of the recording layer has a reflectivity which is up to 40% of the reflectivity of the unrecorded portion when reproducing light is directed from the substrate side.

8. The optical recording medium of claim 6 wherein the wavelength of the recording and reproducing light is in the range of from 600 to 900 nm.

9. The optical recording medium of claim 6 wherein said recording layer contains at least two ionic combinations.

10. The optical recording medium of claim 6 wherein the recording layer contains another cyanine dye.

11. An optical recording medium of the type wherein recording is carried out by directing recording light to a recording layer to form pits and reproduction is carried out by directing reproducing light to the recording layer, and comprising a substrate, a recording layer on the substrate and a reflective layer stacked close to the recording layer, said recording layer contains a light absorbing dye and a bisphenylenedithiol copper complex, said recording layer has an extinction coefficient k of 0.01 to 0.10 as measured at the wavelength of the recording and reproducing light, and said dye is a cyanine dye wherein a first indolenine ring is an uncondensed indolenine ring and a second indolenine ring is a benzoindolenine ring.

12. The optical recording medium of claim 11, wherein an unrecorded portion of the recording layer has a reflectivity of at least 60% and a recorded portion of the recording layer has a reflectivity which is up to 40% of the reflectivity of the unrecorded portion when reproducing light is directed from the substrate side.

13. An optical recording medium of the type wherein recording is carried out by directing recording light to a recording layer to form pits and reproduction is carried out by directing reproducing light to the recording layer, and comprising a substrate, a recording layer on the substrate and a reflective layer stacked close to the recording layer, said recording layer contains an ionic combination of a cyanine dye cation and a bisphenylenedithiol copper complex anion, said recording layer has an extinction coefficient k of 0.01 to 0.10 as measured at the wavelength of the recording and reproducing light, and said cyanine dye having an uncondensed indolenine ring and a benzoindolenine ring.

14. The optical recording medium of claim 13, wherein an unrecorded portion of the recording layer has a reflectivity of at least 60% and a recorded portion of the recording layer has a reflectivity which is up to 40% of the reflectivity of the unrecorded portion when reproducing light is directed from the substrate side.

* * * * *